(12) United States Patent
Ahn et al.

(10) Patent No.: US 12,294,414 B2
(45) Date of Patent: May 6, 2025

(54) METHOD AND DEVICE FOR MULTI-WAVELENGTH PLUG-AND-PLAY QUANTUM KEY DISTRIBUTION WITHOUT TIME DELAY DUE TO WAVELENGTH CONVERSION

(71) Applicant: LG ELECTRONICS INC., Seoul (KR)

(72) Inventors: Byungkyu Ahn, Seoul (KR); Sangrim Lee, Seoul (KR); Hojae Lee, Seoul (KR); JaYeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 312 days.

(21) Appl. No.: 18/003,955

(22) PCT Filed: Jul. 2, 2020

(86) PCT No.: PCT/KR2020/008684
§ 371 (c)(1),
(2) Date: Dec. 30, 2022

(87) PCT Pub. No.: WO2022/004922
PCT Pub. Date: Jan. 6, 2022

(65) Prior Publication Data
US 2023/0283384 A1  Sep. 7, 2023

(51) Int. Cl.
*H04B 10/70* (2013.01)
(52) U.S. Cl.
CPC ................... *H04B 10/70* (2013.01)
(58) Field of Classification Search
CPC ....................................................... H04B 10/70
See application file for complete search history.

(56) References Cited

U.S. PATENT DOCUMENTS 7,580,524 B2 * 8/2009 Gisin .................... H04L 9/0852
713/400
7,809,269 B2 * 10/2010 Mitchell ................ H04B 10/70
398/79
(Continued)

FOREIGN PATENT DOCUMENTS

KR 2019-0053837 5/2019

OTHER PUBLICATIONS

PCT International Application No. PCT/KR2020/008684, International Search Report dated Mar. 9, 2021, 6 page.
(Continued)

Primary Examiner — Tanya T Motsinger
(74) Attorney, Agent, or Firm — LEE, HONG, DEGERMAN, KANG & WAIMEY

(57) ABSTRACT

The present specification provides a method and a device, the method, performed by a device, for transmitting a first pulse train in a quantum communication system being characterized by: receiving a random access (RA) preamble from another device; transmitting an RA response (RAR) to the other device as a response to the RA preamble; performing a radio resource control (RRC) connection process with the other device; receiving data from the other device; and decoding the data on the basis of key information, wherein a first pulse train is generated in a laser diode of the device, and the key information is determined on the basis that the first pulse train passes through both a first path and a second path and is then transmitted from the device to the other device via a quantum channel.

11 Claims, 49 Drawing Sheets

(56) References Cited

U.S. PATENT DOCUMENTS

| | | | | |
|---|---|---|---|---|
| 7,881,473 | B2* | 2/2011 | Wang | H04L 9/0852 |
| | | | | 713/153 |
| 11,362,817 | B2* | 6/2022 | Tomita | G02F 1/035 |
| 11,502,831 | B2* | 11/2022 | Yoshino | H04B 10/508 |
| 12,126,387 | B2* | 10/2024 | Kim | H04L 9/0852 |
| 2015/0341974 | A1 | 11/2015 | Wu et al. | |
| 2017/0010420 | A1 | 1/2017 | Jiang | |
| 2023/0283384 | A1* | 9/2023 | Ahn | H04L 9/08 |
| | | | | 398/43 |
| 2023/0396422 | A1* | 12/2023 | Kim | H04L 9/0852 |
| 2024/0007278 | A1* | 1/2024 | Kim | H04B 10/70 |
| 2024/0039641 | A1* | 2/2024 | Kim | H04B 10/70 |
| 2024/0275493 | A1* | 8/2024 | Williams | H04B 10/70 |
| 2024/0414088 | A1* | 12/2024 | Ochi | H04L 9/0852 |

OTHER PUBLICATIONS

Wei et al., "Analysis of Faraday Mirror in Auto-Compensating Quantum Key Distribution," Chinese Physics Letters, 2015, vol. 32, Issue (08): 080303, Sep. 2015, 7 pages.

Park et al., "User-independent optical path length compensation scheme with sub-ns timing resolution for 1×N quantum key distribution network system," Photonics Research 8. 298 (2020), Quantum Physics (quant-ph), arXiv:2001.00757, Jan. 2020, 9 pages.

\* cited by examiner

METHOD AND DEVICE FOR MULTI-WAVELENGTH PLUG-AND-PLAY QUANTUM KEY DISTRIBUTION WITHOUT TIME DELAY DUE TO WAVELENGTH CONVERSION

CROSS-REFERENCE TO RELATED APPLICATION(S)

This application is the National Stage filing under 35 U.S.C. 371 of International Application No. PCT/KR2020/008684, filed on Jul. 2, 2020, the contents of which is hereby incorporated by reference herein in its entirety.

BACKGROUND OF THE DISCLOSURE

Field of the Disclosure

This specification relates to quantum communication systems.

Related Art

Due to the advent of quantum computers, it has become possible to hack existing cryptographic systems based on mathematical complexity (e.g., RSA, AES, etc.). To prevent hacking, quantum cryptographic communication is proposed.

Meanwhile, in the present specification, it is intended to provide a key rate improvement method of a two-way plug-and-play quantum cryptographic communication technique and an apparatus using the same.

SUMMARY

According to one embodiment of the present specification, in a quantum communication system, a method for determining the key information based on the first pulse train being generated in the laser diode of the device and transmitted from the device to the other device through the quantum channel after passing through the first path and the second path, respectively, may be provided.

According to the present specification, a low sifted key rate of a quantum key distribution technology using a multi-wavelength light source can be improved. In addition, according to the present specification, it is possible to solve the tuning time delay of the tunable laser and the wavelength switching time delay of the tunable optical filter.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

DESCRIPTION OF EXEMPLARY EMBODIMENTS

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband commmunication, massive MTC, URLLC (Ultra-Reliable and Low Latency Communication) is being discussed, in this specification, for convenience, the corresponding technology is referred to as new RAT or NR.

Figure 1:
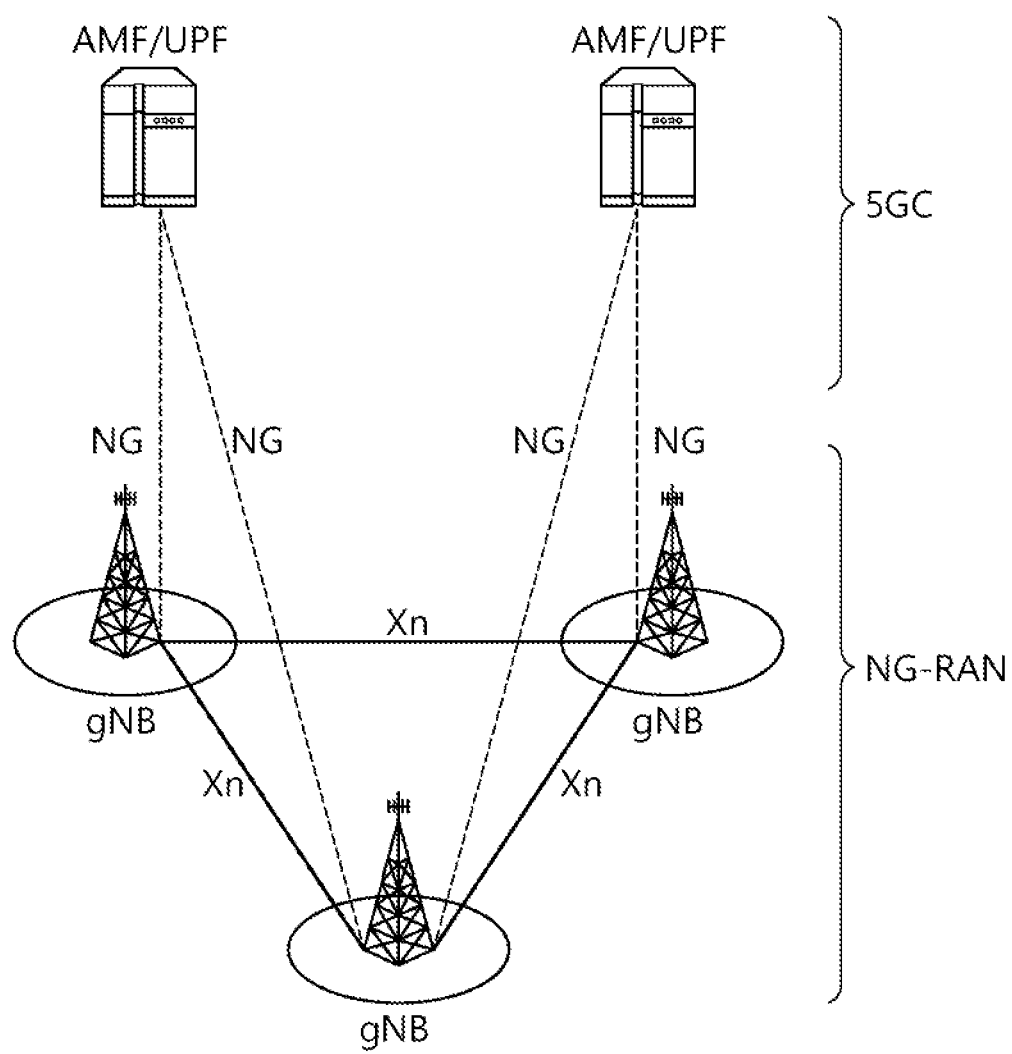
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
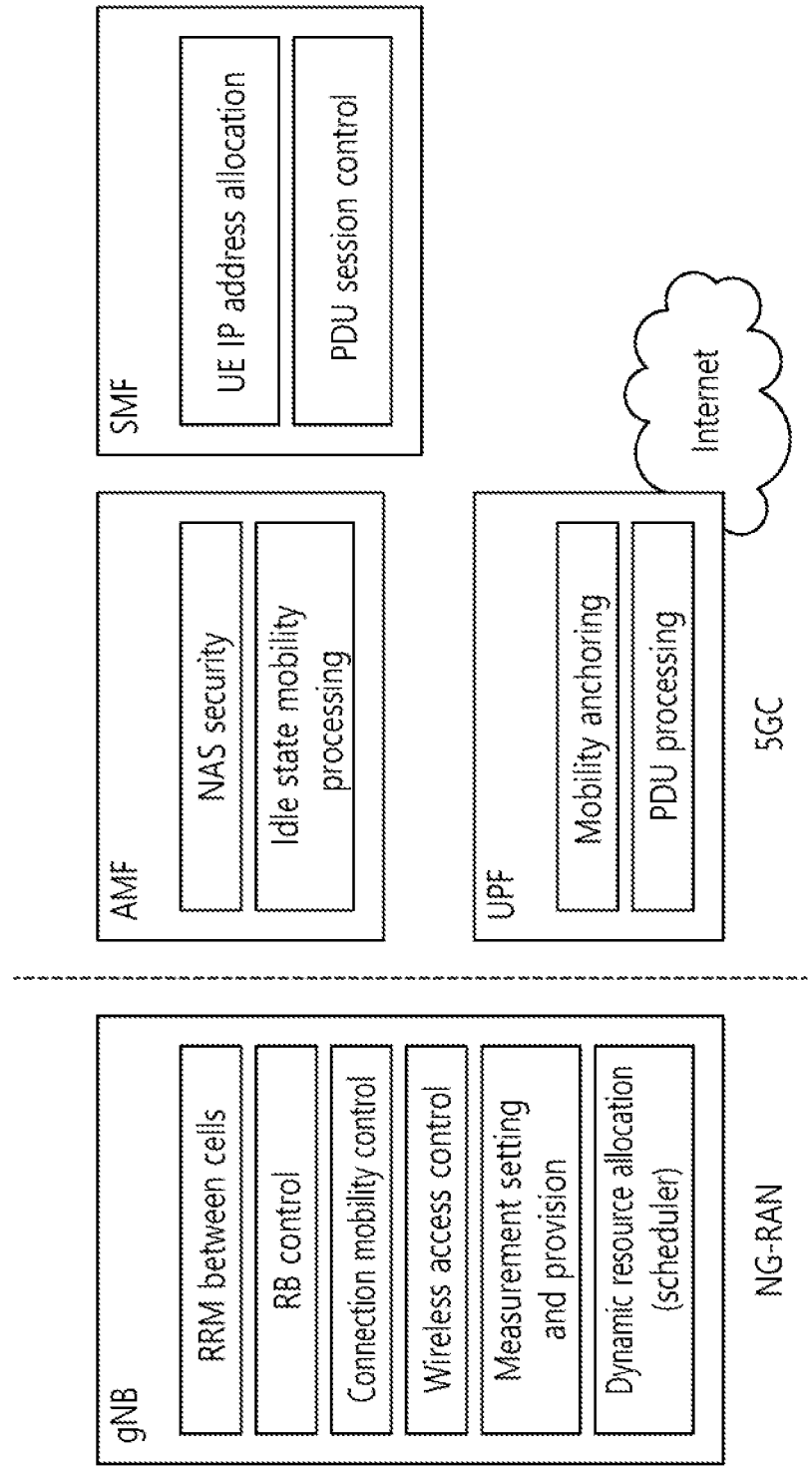
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
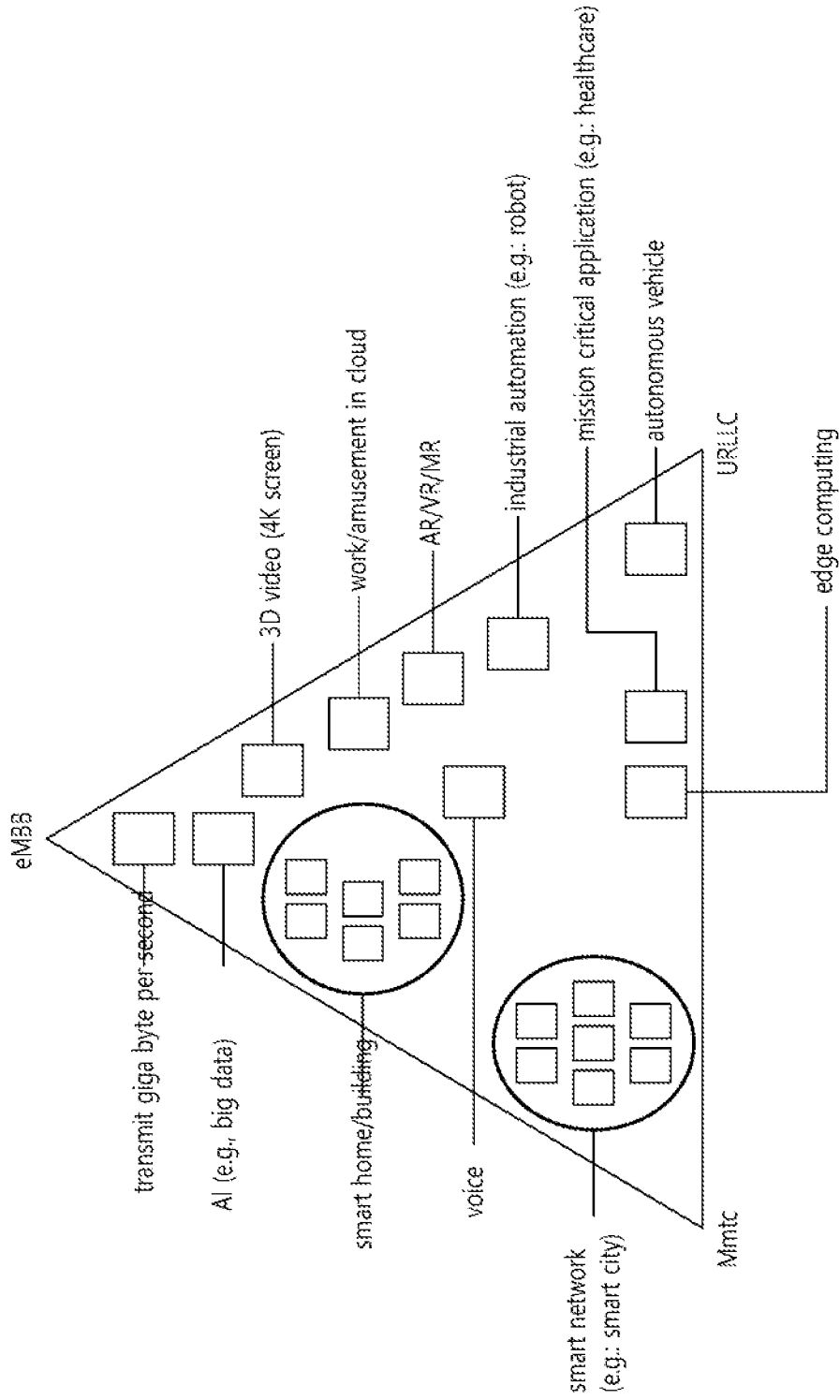
FIG. 3 shows an example of a 5G usage scenario to which the technical features of the present specification can be applied.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

<6G System General>

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

Figure 4:
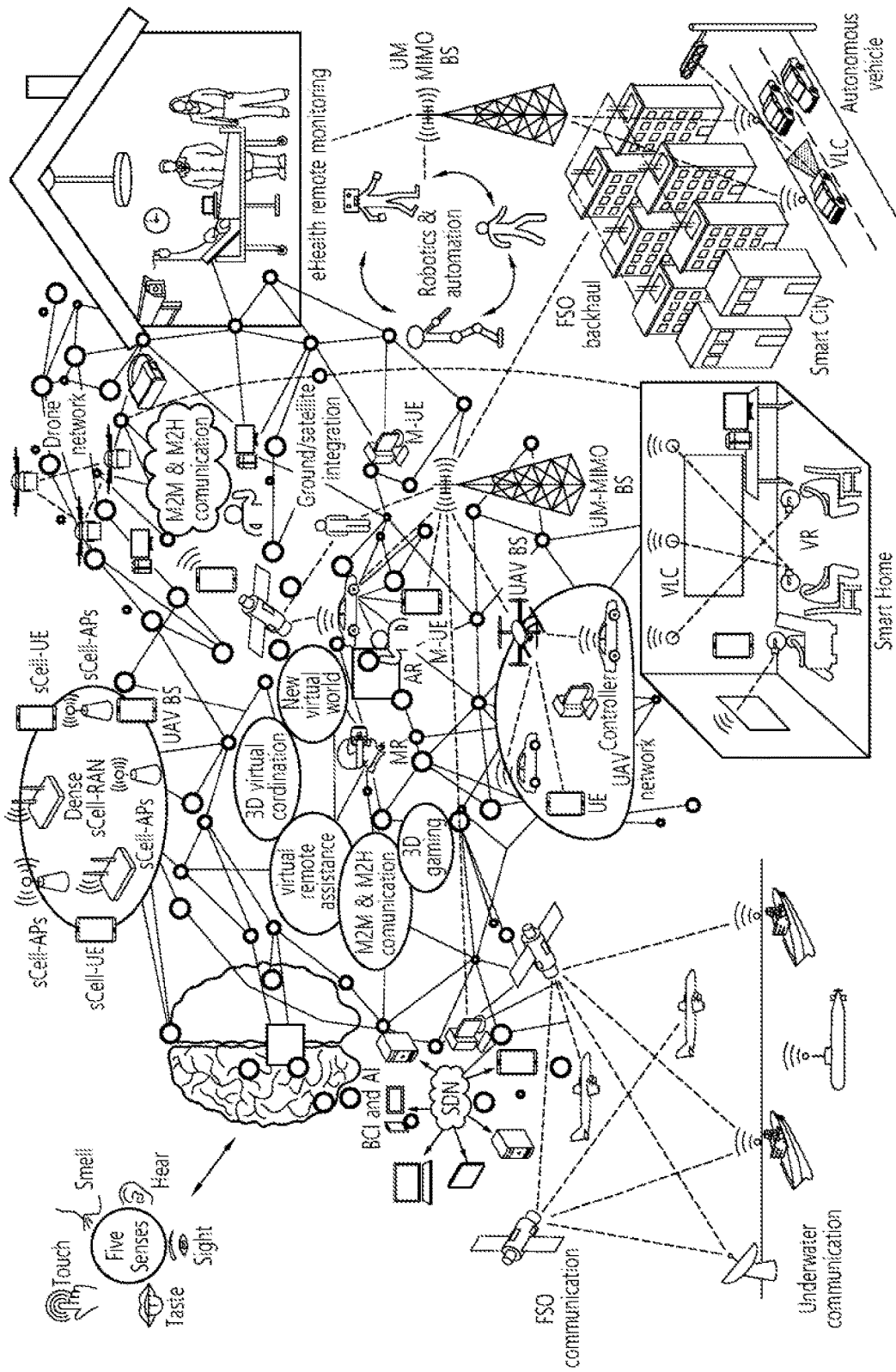
FIG. 4 is a diagram showing an example of a communication structure that can be provided in a 6G system.

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security. FIG. 4 is a diagram showing an example of a communication structure that can be provided in a 6G system. The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

<Core Implementation Technology of 6G System>

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
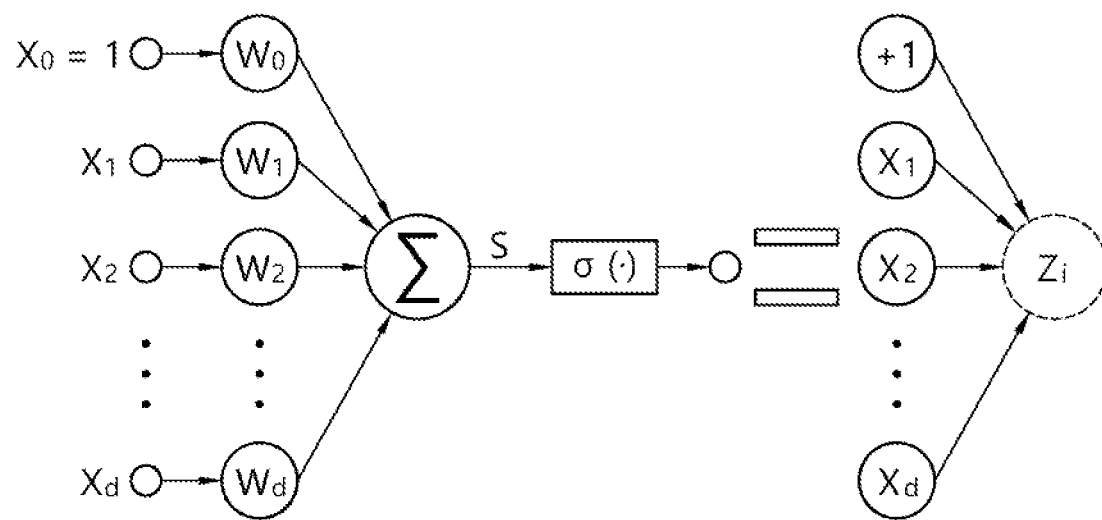
FIG. 5 schematically illustrates an example of a perceptron structure.

FIG. 5 schematically illustrates an example of a perceptron structure.

Referring to FIG. 5, if the input vector $x=(x1,x2, \ldots ,xd)$ is input, each component is multiplied by the weight (W1, W2, \ldots, Wd), after summing up all the results, applying the activation function $\sigma(\cdot)$, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
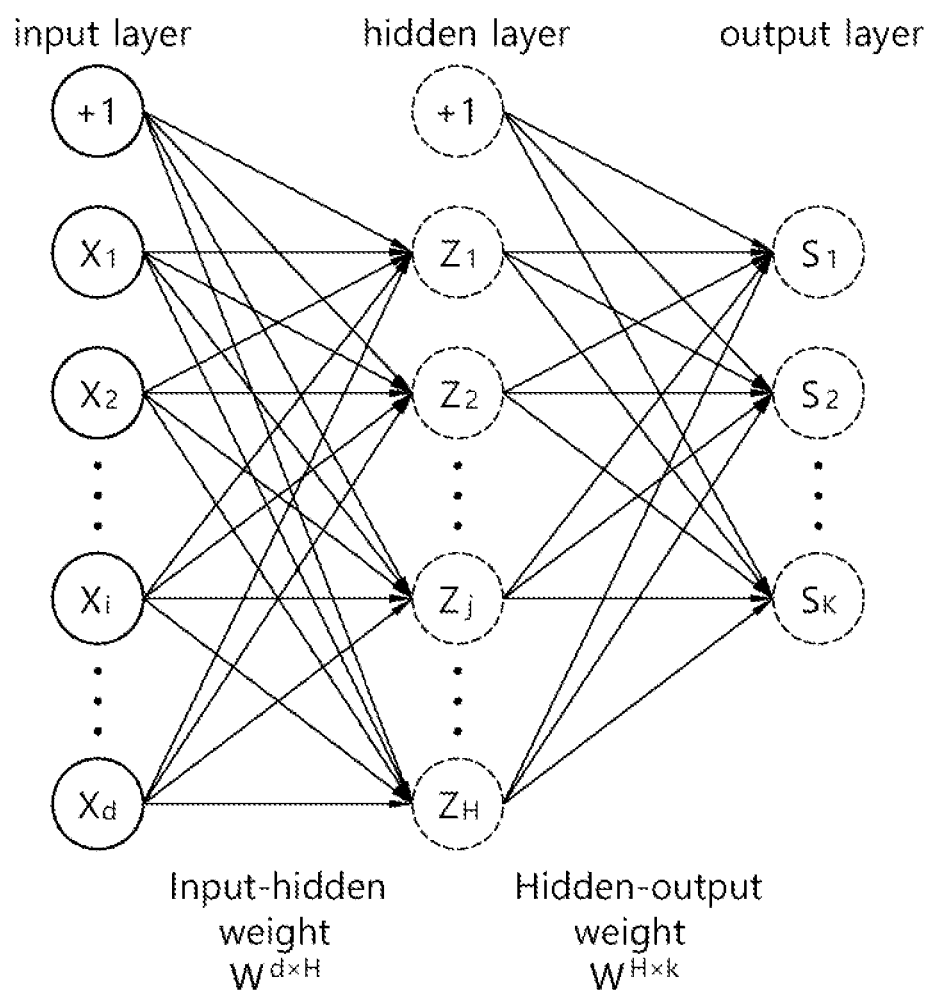
FIG. 6 schematically illustrates an example of a multi-layer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
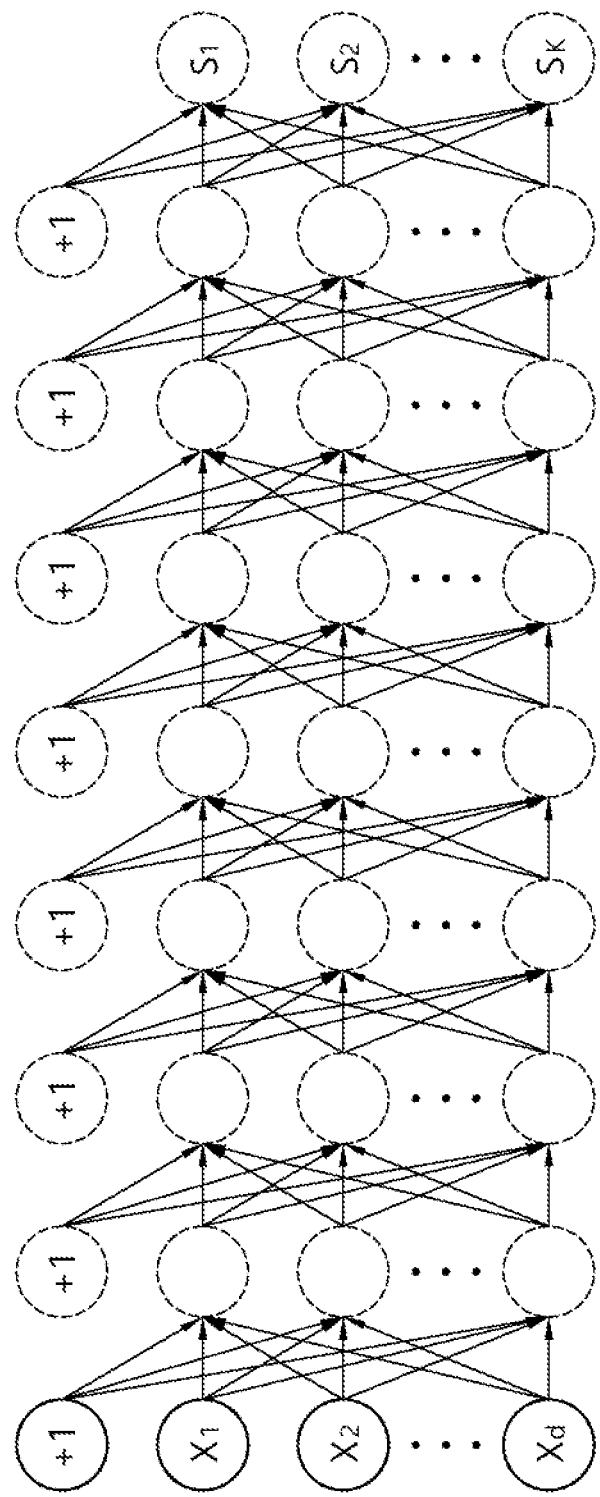
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
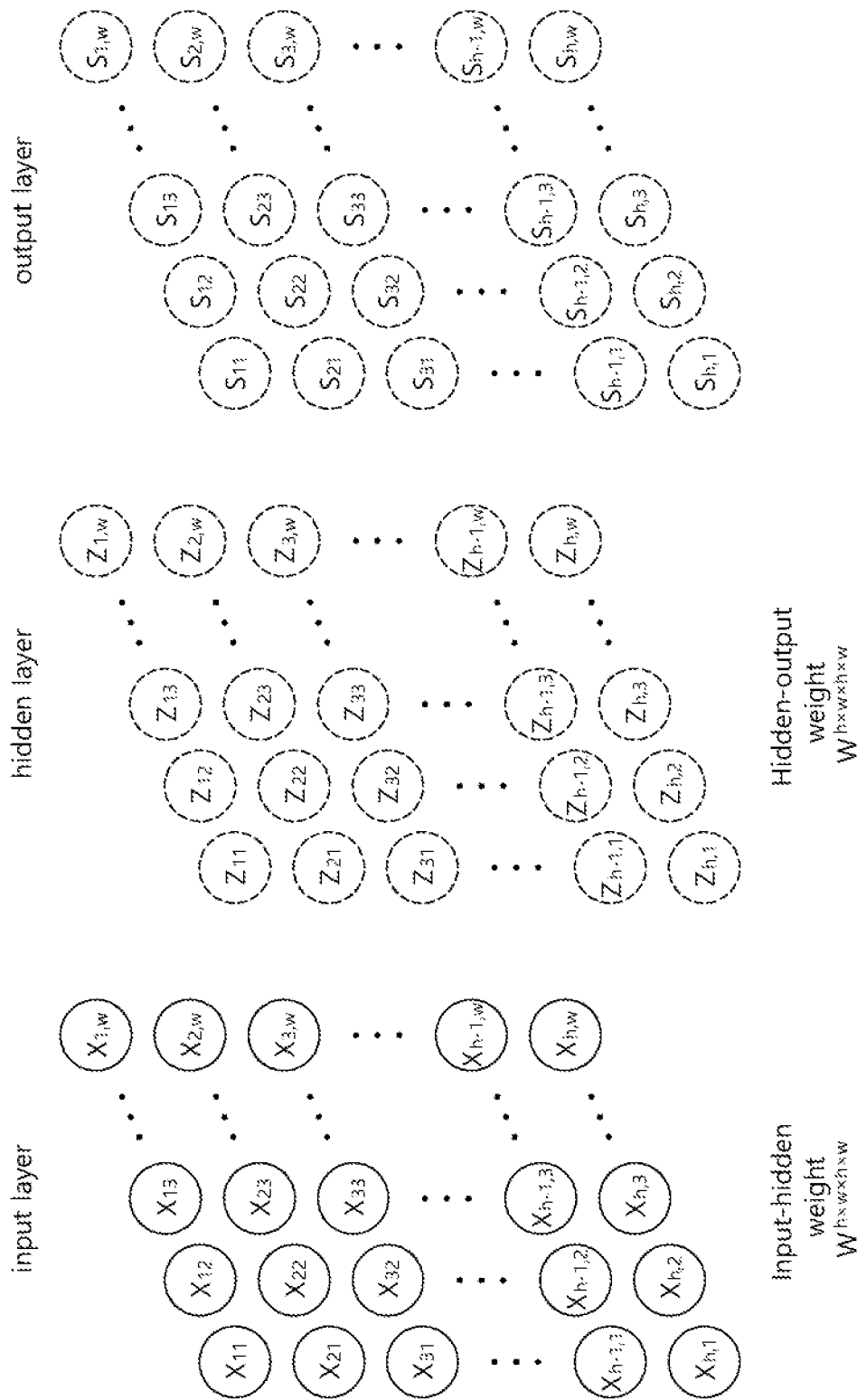
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h Xw weights must be considered. Since there are hXw nodes in the input layer, a total of h2w2 weights are required between two adjacent layers.

Figure 9:
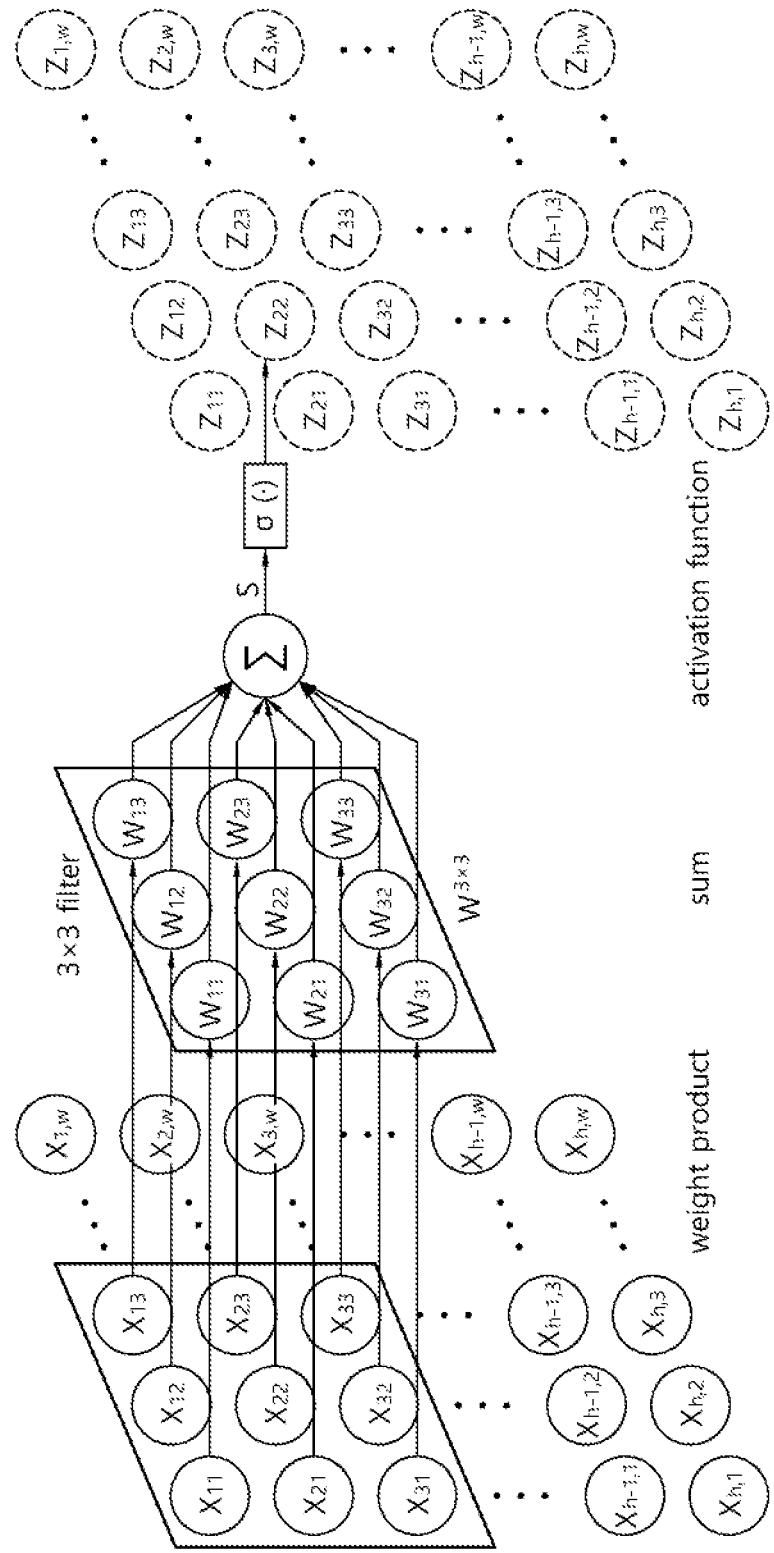
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
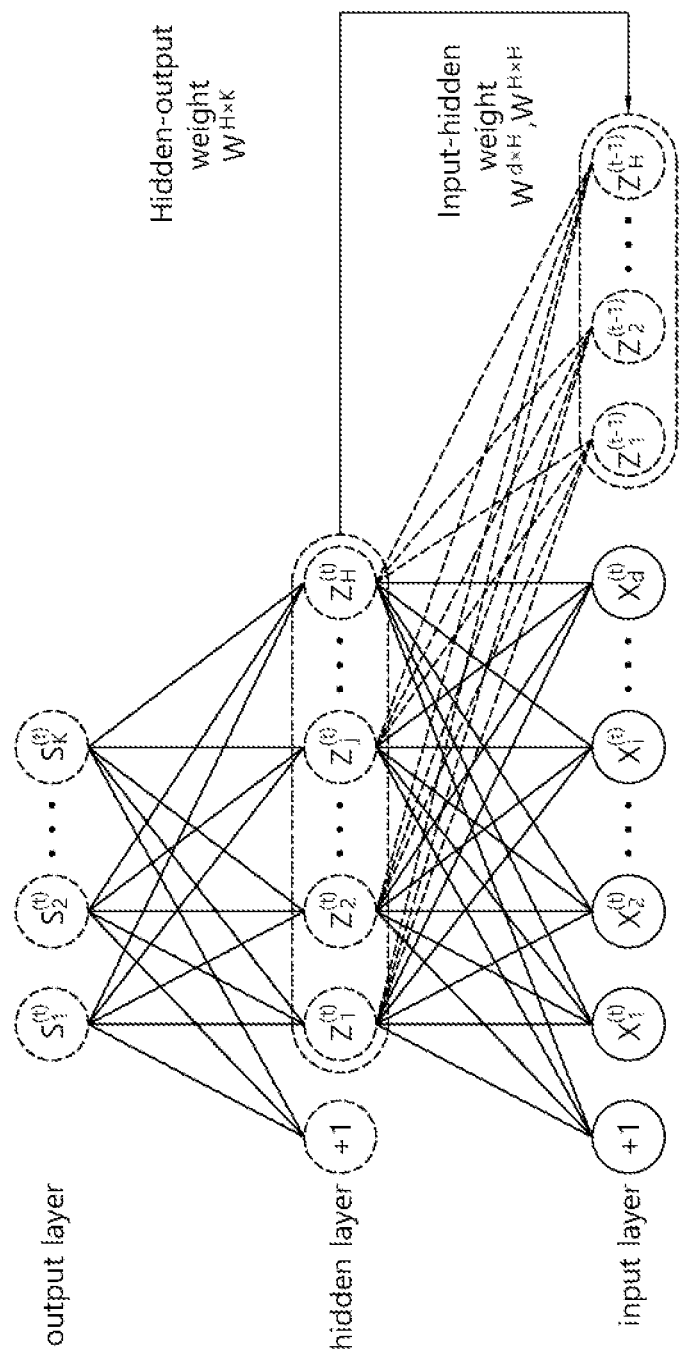
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1(t), x2(t), . . . , xd(t)) of any gaze t on the data sequence to the fully connected neural network, by entering together the hidden vector (z1(t−1), z2(t−1), . . . , zH(t−1)) of the immediately preceding time point t−1. The reason why the hidden vector is transmitted to the next time point in this way is that information in the input vector at previous time points is regarded as being accumulated in the hidden vector of the current time point.

Figure 11:
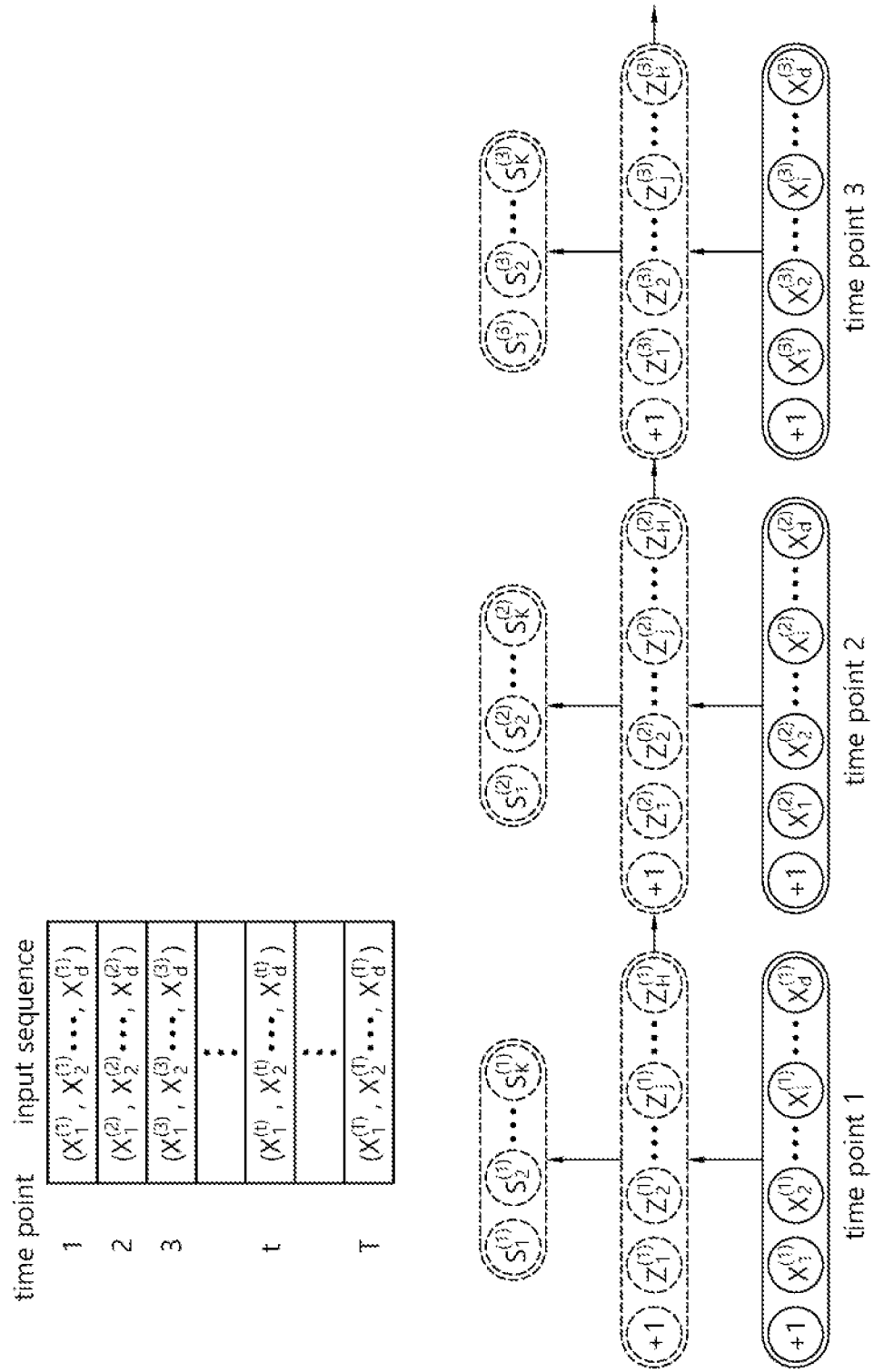
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1),z2(1), . . . ,zH(1)) when the input vectors (x1(t), x2(t), . . . , xd(t)) at time point 1 are input to the recurrent neural network is input together with the input vector (x1(2),x2(2), . . . ,xd(2)) of time point 2, the vector (z1(2),z2(2), . . . ,zH(2)) of the hidden layer is determined through the weighted sum and activation function. This process is repeatedly performed until time point 2, point 3, point T.

Meanwhile, when a plurality of hidden layers are arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mm Wave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
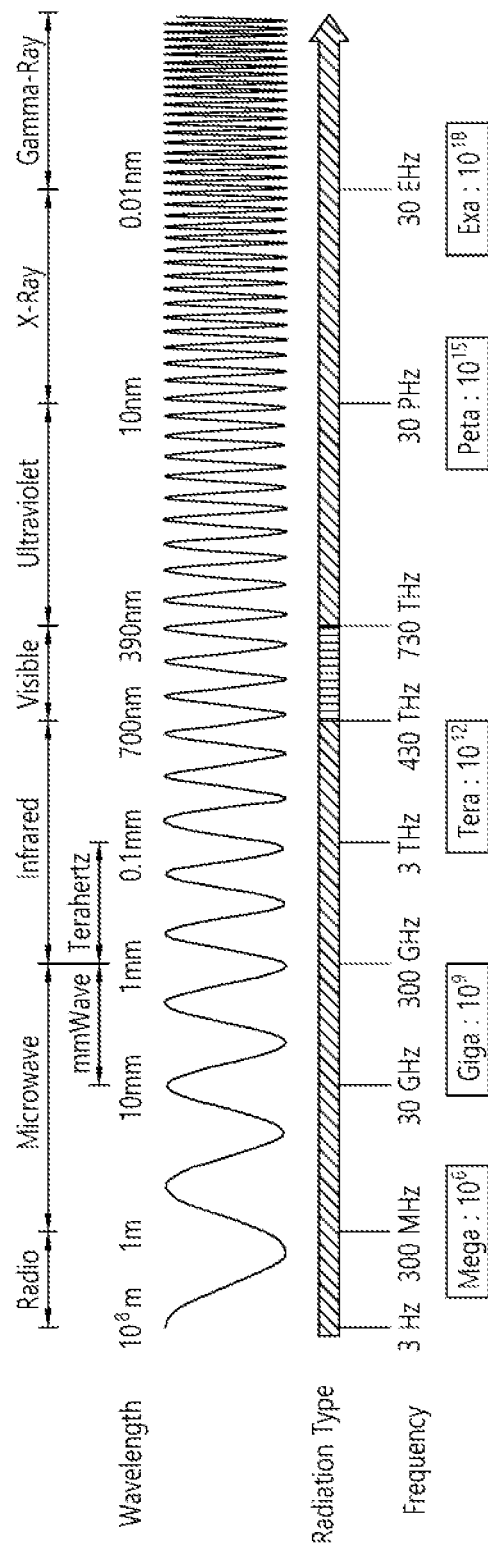
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

<General Terahertz (THz) Wireless Communication>

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
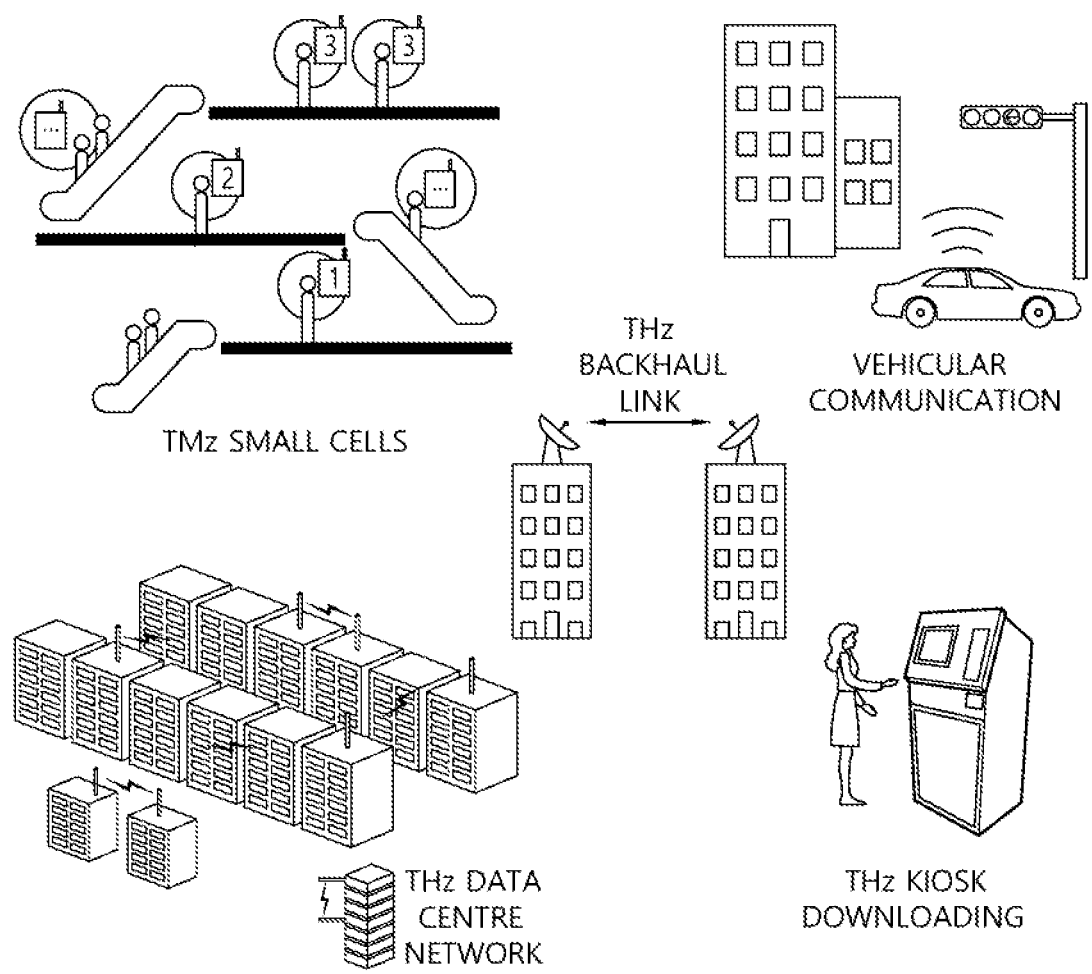
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and | Low order modulation techniques (OOK, QPSK), |

TABLE 2-continued

| | |
|---|---|
| coding | LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on the method for generating and receiving THz. The THz generation method can be classified as an optical device or an electronic device based technology.

Figure 14:
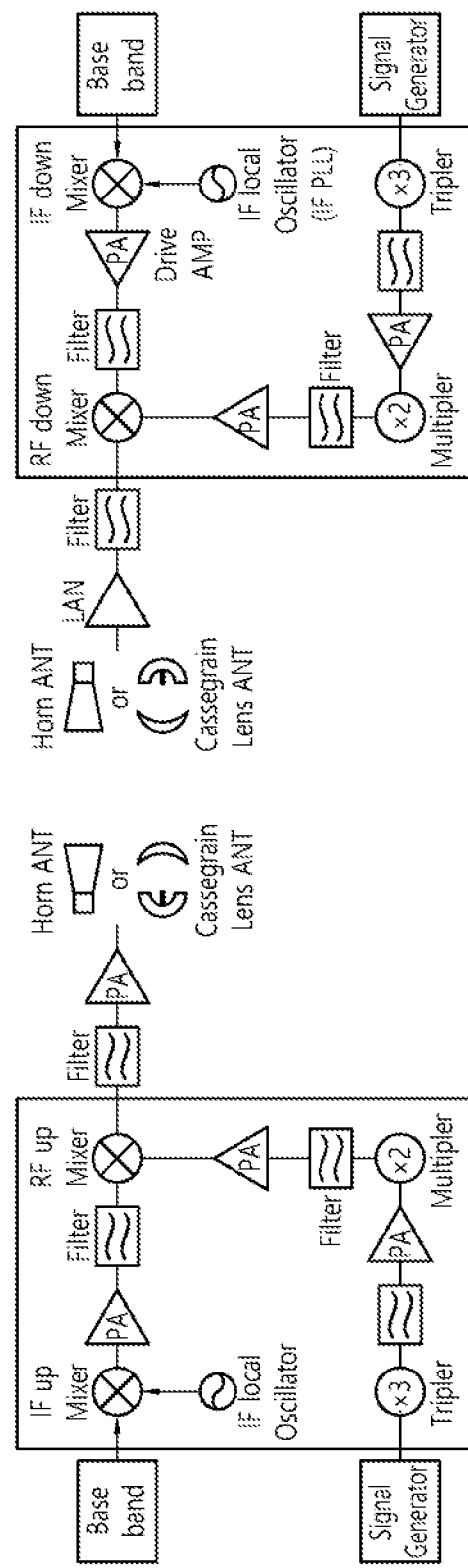
FIG. 14 is a diagram showing an example of an electronic element-based THz wireless communication transceiver.

FIG. 14 is a diagram showing an example of an electronic element-based THz wireless communication transceiver.

the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
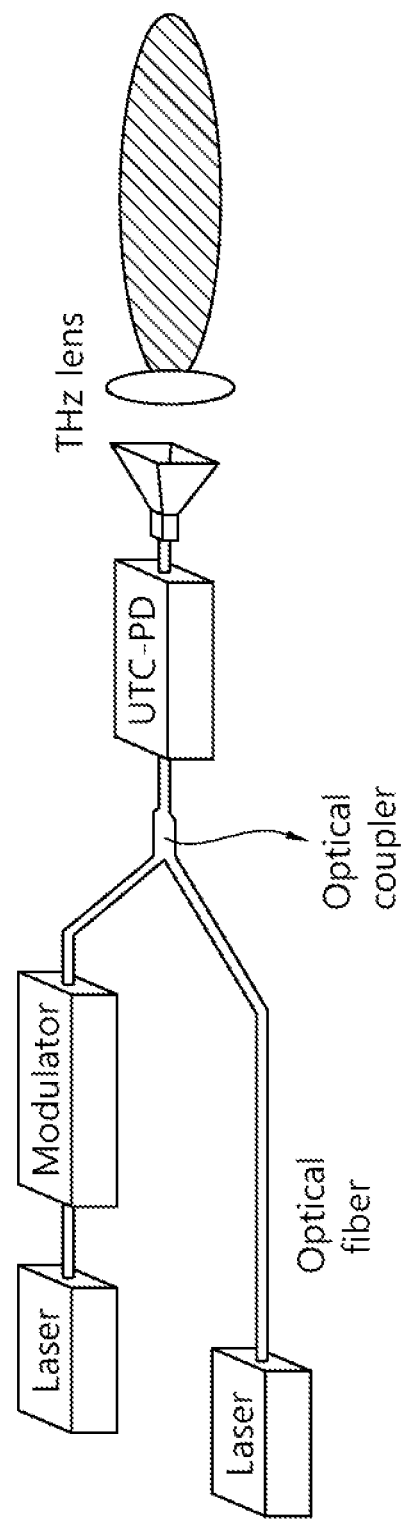
FIG. 15 is a diagram illustrating an example of a method for generating a THz signal based on an optical device.
Figure 16:
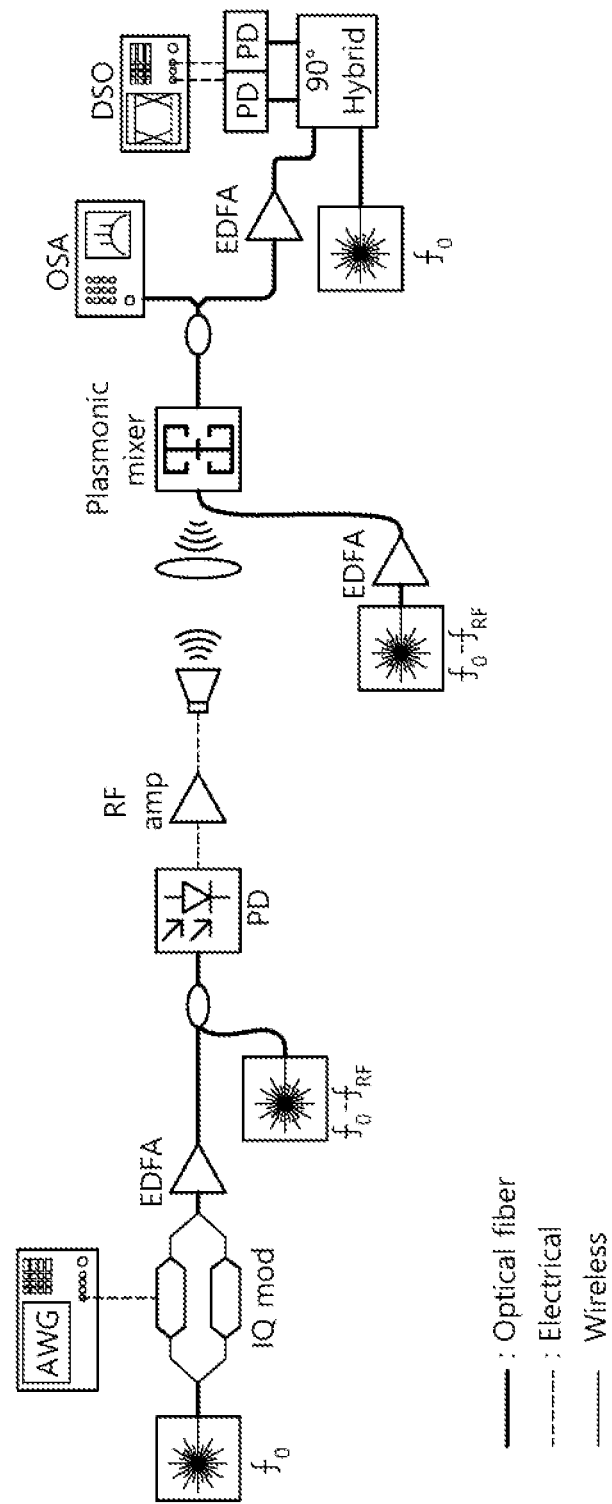
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

Figure 19:
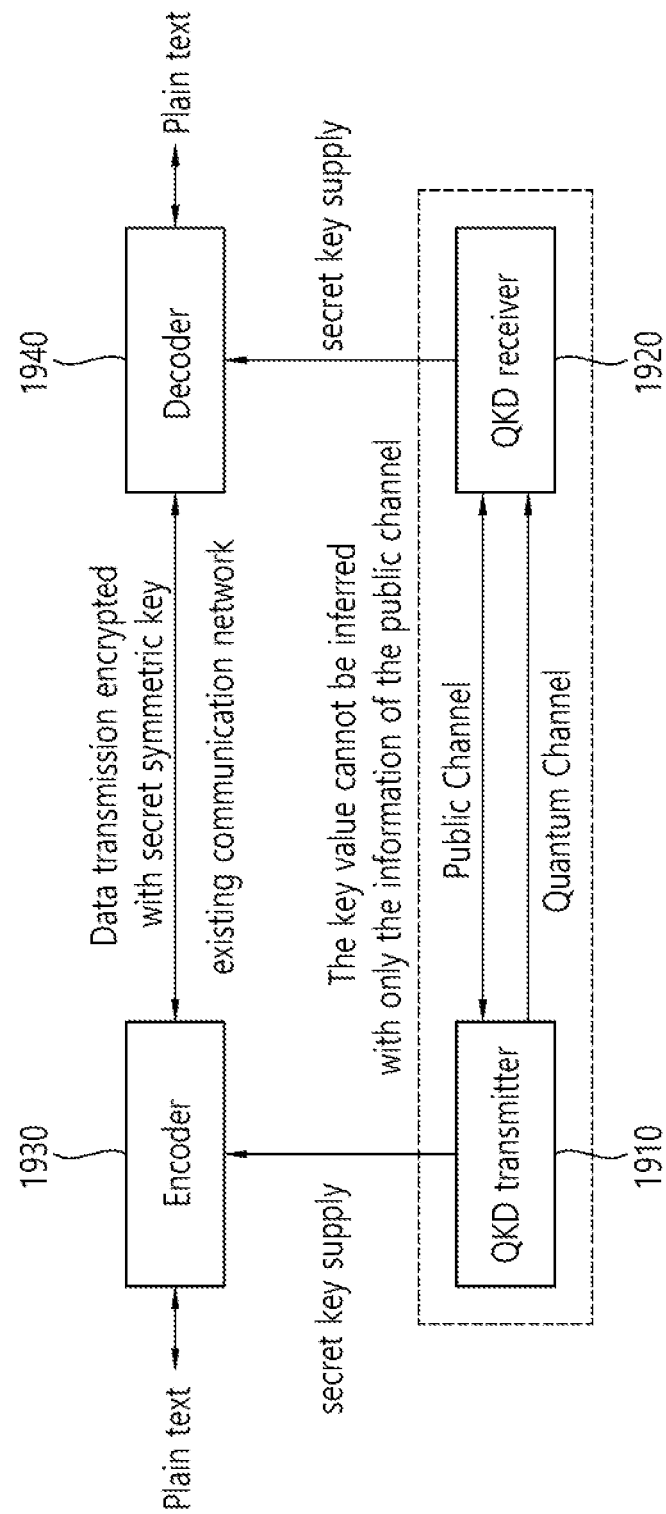
FIG. 19 schematically illustrates an example of quantum cryptographic communication.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 19, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
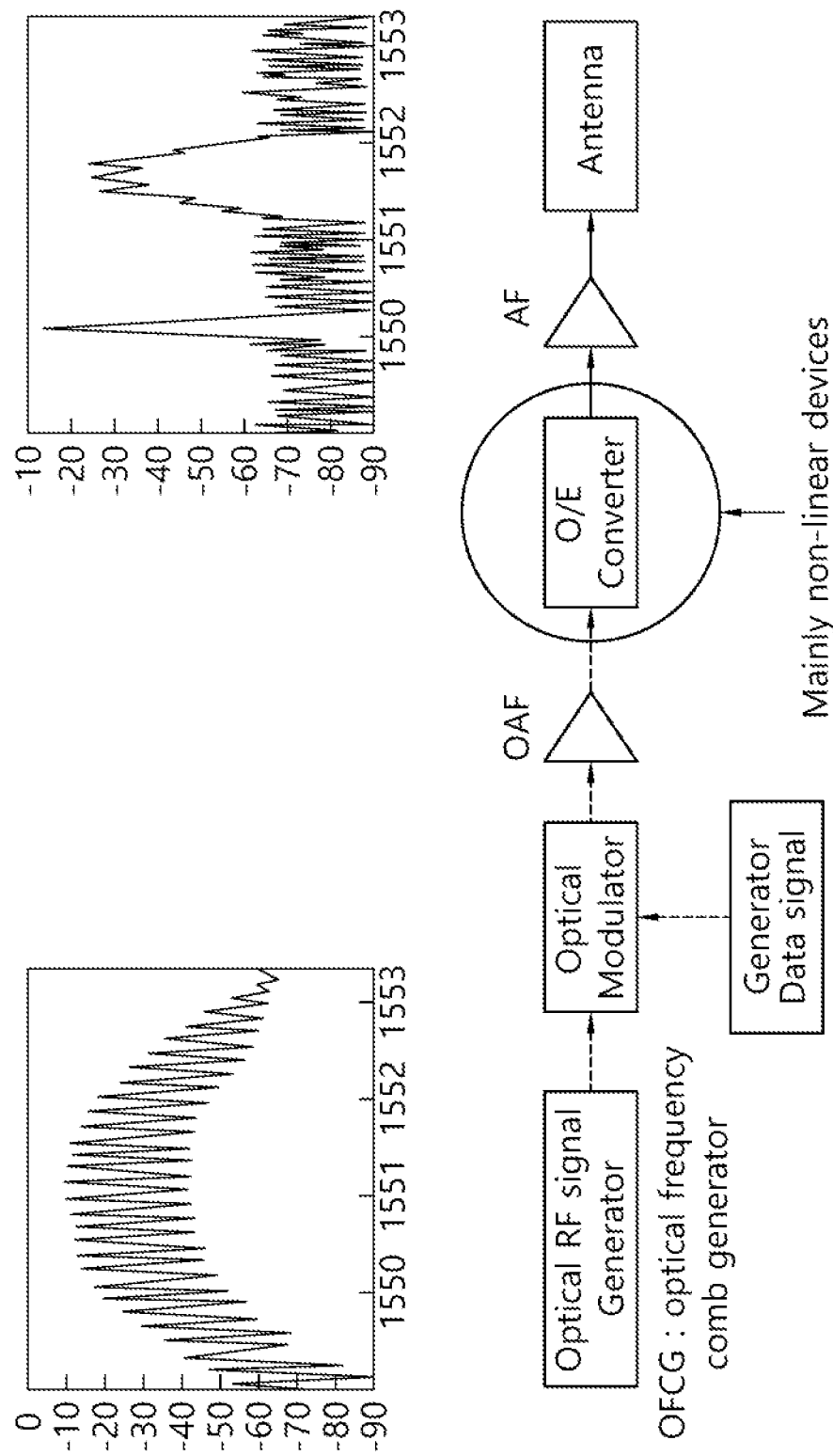
FIG. 17 illustrates a structure of a transmitter based on a photoinc source.
Figure 18:
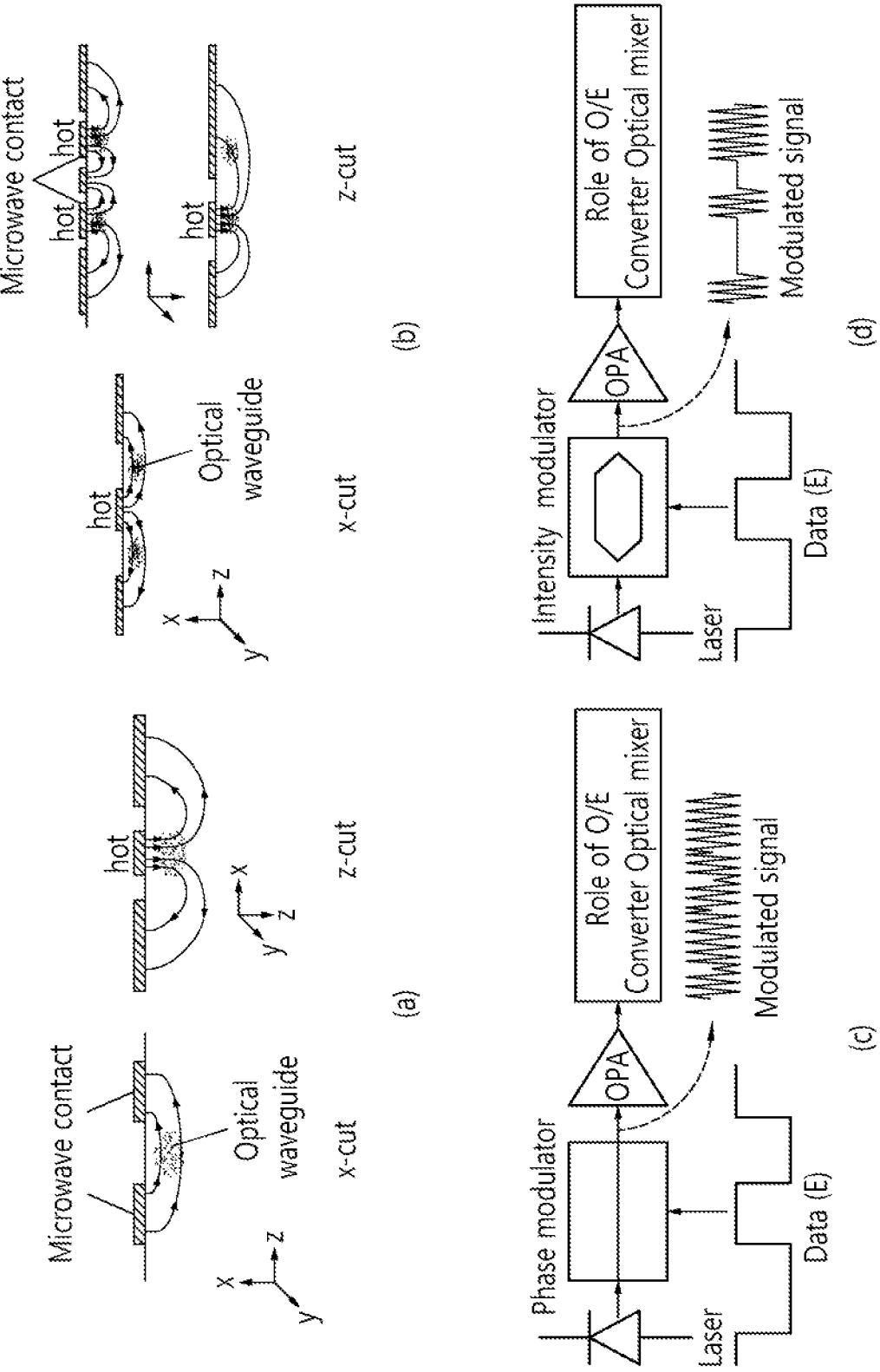
FIG. 18 illustrates a structure of an optical modulator.

The structure of the photoelectric converter (or photoelectric converter) will be described with reference to FIGS. 17 and 18. FIG. 17 illustrates a structure of a transmitter based on a photoinc source, and FIG. 18 illustrates a structure of an optical modulator.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

<Quantum Cryptographic Communication>

FIG. 19 schematically illustrates an example of quantum cryptographic communication.

According to FIG. 19, a quantum key distribution (QKD) transmitter 1910 may perform communication by being connected to a QKD receiver 1920 through a public channel and a quantum channel.

At this time, the QKD transmitter 1910 may supply the secret key to the encryptor 1930, and the QKD receiver 1920 may also supply the secret key to the decryptor 1940. Here, plain text may be input/output to the encryptor 1930, the encryptor 1930 may transmit encrypted data with a secret symmetric key to the decryptor 1940 (through an existing communication network). In addition, plain text may be input/output to the decoder 1940.

According to quantum cryptographic communication, since a secret key for data encryption is distributed using quantum mechanics, it may be impossible for an eavesdropper to find out the information of the encryption key. In summary, quantum cryptographic communication may have the following properties.

Impossibility of copying quantum information: It is impossible to copy quantum information passing through a quantum communication channel Irreversibility of quantum measurement (the state of measuring a single photon once may not be the original state): cannot intercept and resend attack In addition, in quantum cryptographic communication, it is possible to check eavesdropping by checking a quantum bit error rate every time a key is transmitted.

Hereinafter, the basic structure of a (two way) plug-and-play QKD system, contents and problems of improving a key rate through wavelength conversion of a laser light source will be described.

Plug and Play QKD is a protocol that generates key information through phase encoding, and is an efficient quantum cryptographic protocol that is highly resistant to phase and polarization fluctuations and does not require the application of additional correction techniques.

In addition, this technique is not a symmetrical structure in which the Alice side and the Bob side each have a light source and a detector, as shown in the configuration diagram of FIG. 20 below, it can have an asymmetric structure with both a light source and a detector on the bob side.

Due to these structural features, since the plug-and-play QKD system only needs to have a few optical elements required for encoding on the Alice side, the quantum communication system can be configured with low complexity and low cost in a one-to-many quantum cryptographic communication network configuration having one bob side and a plurality of Alice sides. Hereinafter, a plug and play QKD protocol among various protocols of QKD technology will be described through drawings.

Figure 20:
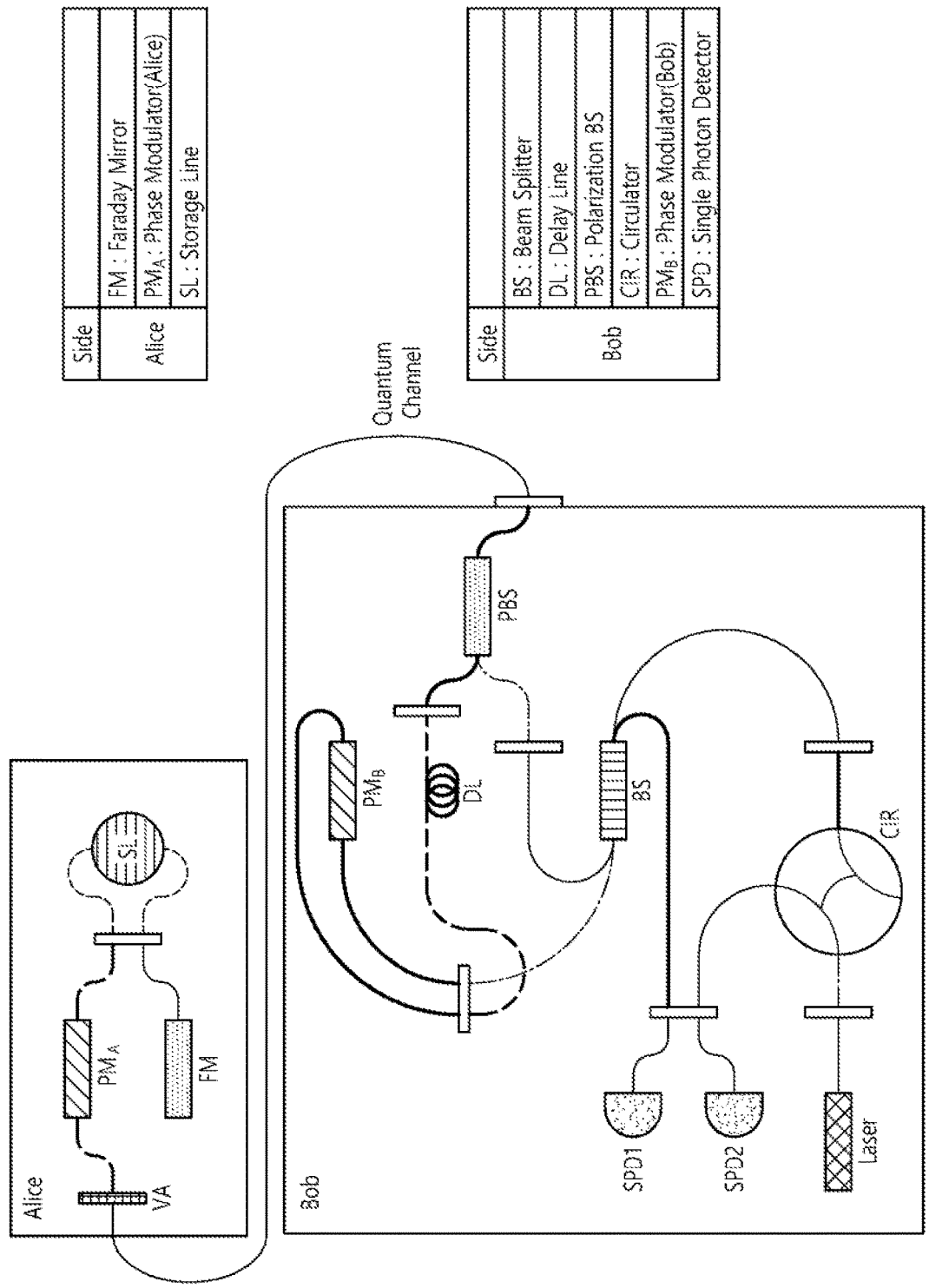
FIG. 20 schematically illustrates an example of a plug-and-play QKD protocol, and FIG. 21 schematically illustrates an example of a one-to-many quantum cryptographic communication network.
Figure 21:
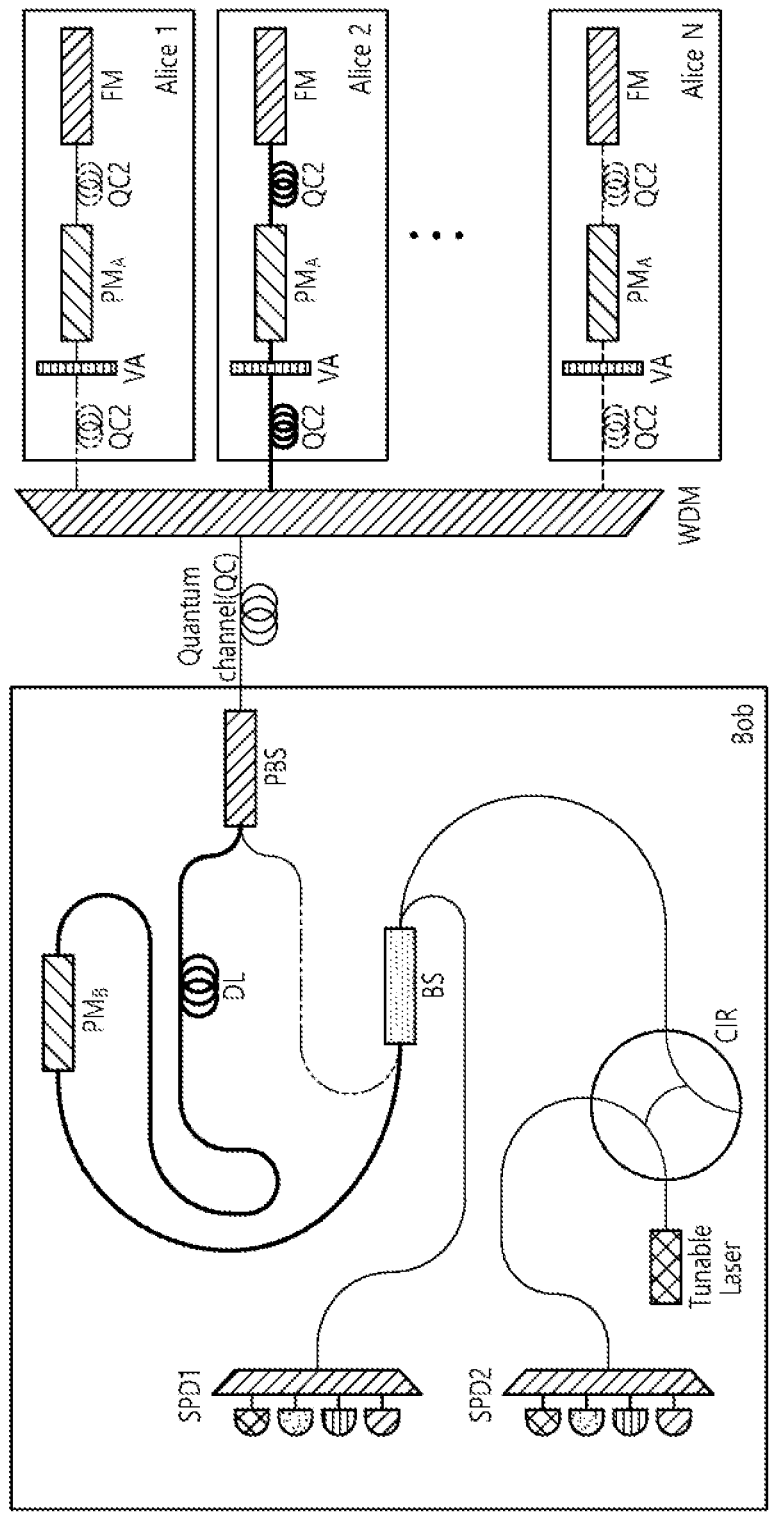

FIG. 20 schematically illustrates an example of a plug-and-play QKD protocol, and FIG. 21 schematically illustrates an example of a one-to-many quantum cryptographic communication network.

According to FIGS. 20 and 21, a basic plug-and-play QKD system can generate a cryptographic key through the following process.

1) The strong laser pulse (1550 nm) emitted from the Bob side is split 50/50 by BS (Beam splitter). Expressing this as an equation, it can be as follows.

$$\text{Laser pulse} - a_1^k (k\text{:time index, 1:line index}) \rightarrow \frac{1}{\sqrt{2}}(a_2^k + ia_3^k) \quad \text{[Equation 1]}$$

2) Two pulses passing through the BS are divided into a short path and a long path with a phase modulator (e.g., PM_B) and a delay line (DL). At this time, the phase modulator PM_B does not operate. And DL is used to create a time difference so that pulses passing through two paths do not overlap at the same time, and generally has a length of several tens of meters. Expressing this as an expression, it can be as follows.

$$\frac{1}{\sqrt{2}}(a_2^k + ia_3^k) \rightarrow \frac{1}{\sqrt{2}}(a_2^k + ia_3^{k+1}) \quad \text{[Equation 2]}$$

3) Pulses passing through the short path and the long path have polarization components perpendicular to each other when passing through the PBS (Polarized Beam Splitter). Therefore, the pulse passing through the short path has the same polarization component as the input pulse even after passing through the PBS, the pulse passing through the long path has a pulse having a polarization perpendicular to the input pulse after passing through the PBS. Expressing this as an equation, it can be as follows.

$$\frac{1}{\sqrt{2}}(a_2^k + ia_3^{k+1}) \rightarrow \frac{1}{\sqrt{2}}(a_2^k - a_3^{k+1}) \quad \text{[Equation 2]}$$

4) The two pulses passing through the PBS pass through the quantum channel with a time difference and move towards Alice.

5) Pulses coming through the channel pass through an attenuator and a phase modulator (e.g., PM_A), but both do not operate at this time.

6) A pulse passing through PM_A passes through a storage line (SL). At this time, the role of the SL (Storage line) is as follows. SL prevents mixing of pulses detected by the detector and pulses including key information measured by the detector due to Rayleigh back-scattering.

In addition, it plays a role in distinguishing between the back scattering pulse generated from the pulse coming from Bob to Alice in PM_A and the pulse returning from Alice after passing FM.

Back scattering occurs when a pulse generated from a laser is partially reflected while passing through each element, and non-key information is measured by a detector. In particular, since many errors may occur due to Rayleigh backscattering that occurs when light pulses travel in a communication structure of a bidirectional reciprocating structure, it is a factor that significantly degrades the performance of quantum cryptographic communication.

In the plug-and-play QKD protocol, when the efficiency of the single photon detector is n_d and the pulse width is 8, the effect of Rayleigh back scattering can be expressed as the following equation by the relationship between P_in, the number of photons generated per second on the bob side, and P_rayleigh, the number of double Rayleigh back scattering.

$$P_{Rayleigh} = \left[1 - \exp\left(-2\alpha\left(\frac{\ln 10}{10}\right)L\right)\right]\beta P_{in}\delta n_D \quad \text{[Equation 4]}$$

Where P_in is defined as P_in=f_laser·n_b (f_laser: pulse repetition rate, n_b: total loss factor on the bob side), α is 0.21 dB/km, which is a fiber loss of 1550 nm, L is the length of the fiber between Alice and Bob, and β is the Rayleigh back scattering coefficient. Therefore, it can be seen that the larger P_in is, the greater the influence of Rayleigh-back scattering is. Therefore, to solve this problem, a storage line with a length long enough to store the pulse train generated by the bob side may be required.

For example, assuming that a pulse is generated at 1 MHZ (e.g. $10^{\wedge}(-6)(s)$), the transmission speed of light in a wired optical fiber is $2 \times 10^{\wedge}8$ (m/s), and the number of keys generated at once is 125, a total of $2 \times (10^{\wedge}8 \text{ (m/s)}) \times 10^{\wedge}(-6)$ (s)×125=25 km of storage lines may be required. In this case, since the storage line SL may store photons while reciprocating, the actual length may be 12.5 km or more, which is half of 25 km. As such, in the current plug-and-play QKD technique, a storage line with a very long length is applied to the Alice side, in order to apply this technology to various areas such as one-to-many quantum cryptography in the future, it may be necessary to reduce the weight of the Alice side by minimizing the length of the SL.

7) In the FM (Faraday Mirror), the polarization of the pulse emitted from the rice side passing through the PBS is reflected and then changed 90 degrees again. (The role of the Faraday Mirror: By changing the incident polarization to a polarization perpendicular to this, when the pulse goes back to Bob, the short path pulse enters the long path by PBS, and the long path pulse enters the short path. Therefore, since the polarization is perpendicular to each other when traveling and when reflecting back, the birefringence experienced by light pulses on the optical fiber cancels each other, making it possible to build a stable system.) This can be expressed as an equation as follows.

$$\frac{1}{\sqrt{2}}\left(a_2^k - a_3^{k+1}\right) \to \frac{1}{\sqrt{2}}\left(ia_2^k - ia_3^{k+1}\right) \quad \text{[Equation 5]}$$

8) Pulses that pass through the SL after being reflected from the FM generate key information through phase coding in the phase modulator (eg, PM_A). Key information according to the phase is shown in Table 3 below.

TABLE 3

| phase | key value |
|---|---|
| 0(−) | 0 |
| π/2(\) | 0 |
| π(∣) | 1 |
| 3π/2(/) | 1 |

As described above, phase coding may be performed by applying four different phases (θ_A) to the second pulse passing through PM_A on the Alice side. Expressing this as an expression, it can be as follows.

$$\frac{1}{\sqrt{2}}\left(ia_2^k - ia_3^{k+1}\right) \to \frac{1}{\sqrt{2}}\left(ia_2^k - ie^{i\theta_A}a_3^{k+1}\right) \quad \text{[Equation 6]}$$

9) After reducing the intensity of the optical signal to the level of a single photon using an attenuator, a pulse is transmitted through a quantum channel. (At this time, the 0.1 photon level can generally be used.)

10) The polarization state of the pulse when exiting the PBS to the quantum channel and the pulse when entering the PBS from the quantum channel are opposite due to FM. Therefore, the two pulses that go through the long path and the short path when going out from Bob to the channel will go through the opposite path when returning from the channel to Bob. Expressing this as an expression, it can be as follows.

$$\frac{1}{\sqrt{2}}\left(ia_2^k - ie^{i\theta_A}a_3^{k+1}\right) \to \quad \text{[Equation 7]}$$

$$\frac{1}{\sqrt{2}}\left(-a_3^k - ie^{i\theta_A}a_3^{k+1}\right) \to \frac{1}{\sqrt{2}}\left(-a_3^{k+1} - ie^{i\theta_A}a_3^{k+1}\right)$$

11) The first pulse entering Bob through the quantum channel passes through a long path and determines the measurement basis by applying two phases (θ_B) as shown in Table 4 in PM_B.

TABLE 4

| phase | basis value |
|---|---|
| 0 | + |
| π/2 | X |

Expressing this as an equation, it can be as follows.

$$\frac{1}{\sqrt{2}}\left(-a_3^{k+1} - ie^{i\theta_A}a_3^{k+1}\right) \to \frac{1}{\sqrt{2}}\left(-e^{i\theta_B}a_3^{k+1} - ie^{i\theta_A}a_3^{k+1}\right) \quad \text{[Equation 8]}$$

12) The first pulse (passing the long path) and the second pulse (short path) passing through the two paths of the bob side arrive at the BS at the same time, at this time, they overlap each other and cause constructive or destructive interference. Expressing this as an expression, it can be as follows.

$$\frac{1}{\sqrt{2}} \quad \text{[Equation 9]}$$

$$\left\{\frac{1}{\sqrt{2}}\left(-ie^{i\theta_B}a_4^{k+1} - e^{i\theta_B}a_5^{k+1}\right) + \frac{1}{\sqrt{2}}\left(-ie^{i\theta_A}a_4^{k+1} + e^{i\theta_A}a_5^{k+1}\right)\right\} =$$

$$-\frac{1}{2}i\left(e^{i\theta_B} + e^{i\theta_A}\right)a_4^{k+1} - \frac{1}{2}\left(e^{i\theta_B} - e^{i\theta_A}\right)a_5^{k+1}$$

13) The detection result according to the overlapping result is determined which of detectors 1 and 2 will be measured, and the result may be shown in Table 5 below.

TABLE 5

| bob/alice | 0(0, −) | π/2(0, \) | π(1, ∣) | 3π/2(1, /) |
|---|---|---|---|---|
| 0, + | 1 | | 2 | |
| π/2, X | | 1 | | 2 |

But, in the existing two way Plug and Play QKD technique, in order to minimize the generation of back scattering pulses, since one pulse train is detected by a detector and then the next pulse train is transmitted, key rate loss is high.

Therefore, in order to improve the key rate loss problem, the following two methods can be considered. The first method is a method of using two lasers having different wavelengths as a light source, which will be described through drawings as follows.

Figure 22:
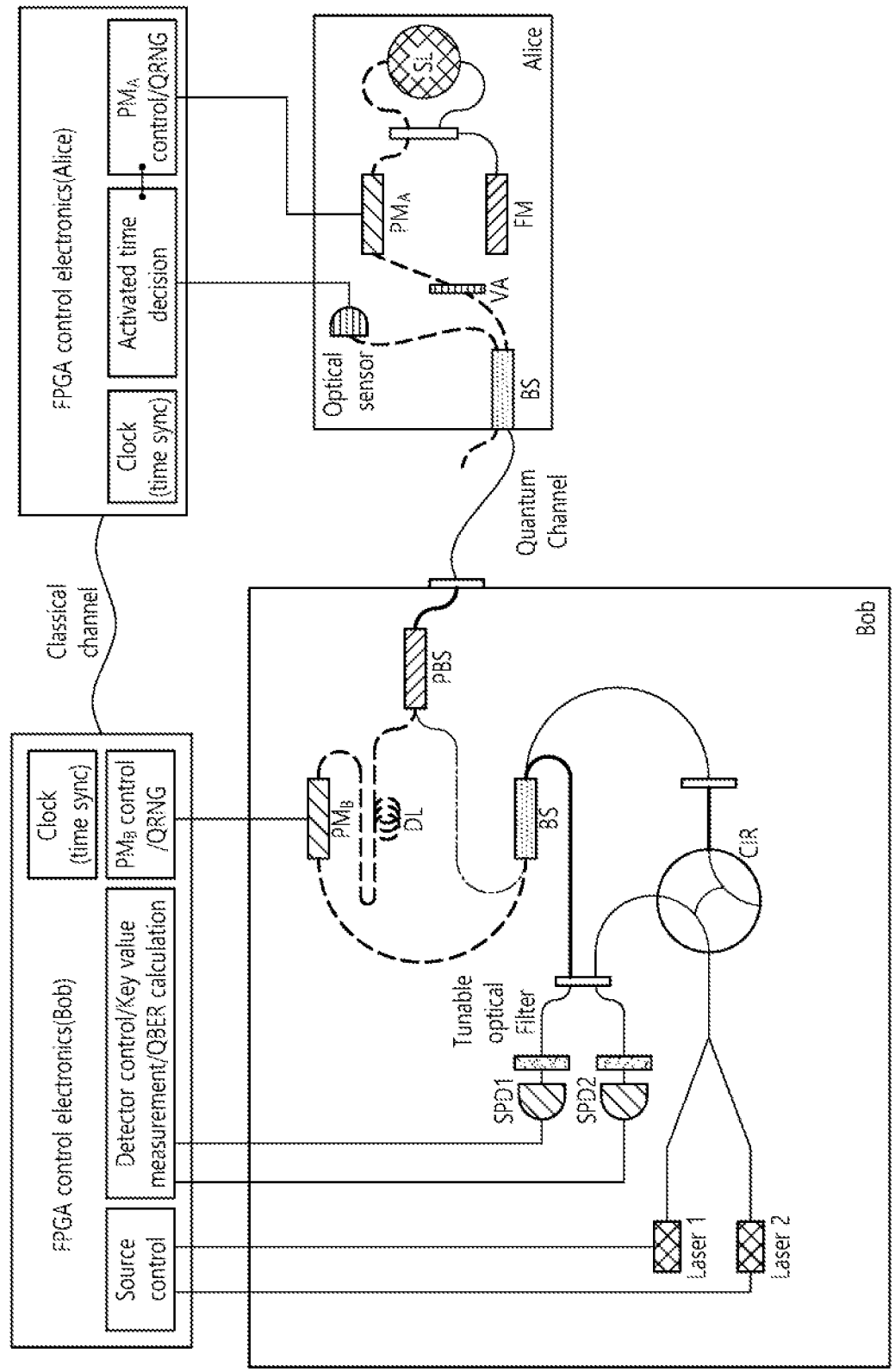
FIG. 22 schematically illustrates an example of a two laser diode based plug and play QKD system.

FIG. 22 schematically illustrates an example of a two laser diode based plug and play QKD system.

In this way, by generating different wavelengths of lasers 1 and 2 as λ_1 (nm) and λ_2 (nm), first, one pulse train is generated in laser 1 with a wavelength of λ_1 (nm), subsequently, a pulse train having a wavelength of λ_2 (nm) is generated by laser 2.

Regarding the conventional back scattering pulse problem that occurs when continuously sending pulse trains having the same wavelength, because the wavelengths of the front and rear pulse trains are different, all other backscattering pulses, except for the signals of the wavelengths to be received from the optical filters installed immediately before the detectors SPD1 and 2, have different wavelengths, so they can be blocked.

In this way, therefore, it was shown that a QKD system with a higher key rate can be made by increasing the number of optical signals having different wavelengths generated by the tunable laser, the improvement effect can be expressed by the following formula. R_conv1 means the shifted key rate in the conventional scheme of FIG. 20, R_conv2 represents the shifted key rate (when using two lasers) of the scheme in FIG. 22. The R_conv2 technique has a slight loss of 10^(−α_f/10)(α_f: filter loss) due to the addition of an optical filter, but since it can contain more pulses proportional to the additional number of laser light sources with different wavelengths, it can be seen that it is possible to have a higher shifted key rate compared to existing techniques.

$$R_{conv1} = \frac{1}{2} f \mu n_f n_B n_D \times \frac{L_{SL}}{L_{Channel} + L_{SL}} \qquad \text{[Equation 10]}$$

$$R_{conv2} = \frac{1}{2} f \mu n_f n_B n_D 10^{-\alpha_f/10} \times \frac{2L_{SL}}{L_{Channel} + L_{SL}} \qquad \text{[Equation 11]}$$

Here, each variable in the above equation may be as follows.
L_Channel: channel length,
L_SL: storage line length,
f: pulse repetition rate,
μ: mean photon number,
n_f: fiber transmission coefficient, (e.g. n_f=10^(−α_1*L_(channel/10)), α_1: 1550 nm fiber loss, 0.2 dB/km),
n_B: Total loss inside Bob, (e.g. n_B=10^(−L_(Bob)/10)),
n_D: Detection efficiency of SPD However, this method also has a problem in that it is difficult to avoid high cost, increase in volume and weight of the Bob side because a larger number of laser diodes must be used to improve the key rate.

A way to solve this is a QKD system based on one tunable laser that avoids the increase in volume and weight of the bob side.

A tunable laser is a light source that generates a pulse of a desired wavelength through a process of filtering an optical band pass and amplifying a passed wavelength after simultaneously generating multi-wavelength pulses internally.

Therefore, in this method, one pulse train is generated with a wavelength of λ_1 nm, the generation wavelength of the tunable laser is changed to a desired wavelength 2_2 nm, and then the next pulse train is created. Therefore, it has the advantage that there is no need to use multiple laser diodes to create multi-wavelength pulses. Therefore, a high shifted key rate can be obtained with only one tunable laser, and the value is as follows.

$$R_{conv3} = \frac{1}{2} f \mu n_f n_B n_D 10^{\frac{\alpha_f}{10}} \times \left(1 - \frac{Int[f \cdot t_{sw} - 1]}{N}\right)\left(1 - \frac{Int[f \cdot t_m - 1]}{N}\right) \qquad \text{[Equation 12]}$$

Here, each variable in the above equation may be as follows.
t_sw: tunable filter switching time,
t_tn: wavelength tuning time for tunable laser (Wavelength tuning time for tunable laser),
N: the number of pulses=2*f*L_s/v_g,
L_s: length of storage line,
v_g=2×10^8 (m/s),
Int[x]: Minimum integer value that satisfies m≥x As shown in the above equation R_conv3, using a tunable laser can solve the key rate loss problem due to back scattering pulses in the QKD system. However, there are problems in that the range in which wavelengths can be converted is not wide and a lot of time is consumed for wavelength conversion of the tunable laser and the tunable optical filter.

In the above expression, Int[f·t_tn−1]/N represents the ratio of pulses not generated by the tunable laser during the wavelength tuning time in one pulse train composed of N pulses, Int[f t_sw−1]/N represents a ratio of signals not detected by a detector because it does not pass through the filter during the wavelength switching time in the tunable optical filter.

Therefore, this method can be an efficient method with a high key rate when the time required for wavelength conversion of the tunable laser and filter is short, but in the case of f·t_sw>>1 or f·t_tn>>1, key rate loss due to wavelength conversion time may be very large.

In addition, considering that most of the tuning speeds of tunable lasers and tunable filters currently used as commercial models are up to several tens of nm/s, since the wavelength conversion time is expected to be as long as ms, the key rate loss due to wavelength conversion is not negligible.

Hereinafter, this Specification is Demonstrated.

The present specification relates to a cryptographic communication technique through quantum key distribution (QKD) in a quantum secure communication system. More specifically, in a plug-and-play quantum key distribution system among QKD techniques, using a tunable laser and a tunable optical filter, the present document relates to an efficient method, apparatus and system for increasing quantum key transmission rates through the application of wavelength conversion to signals.

In particular, this specification proposes a method for solving the key rate loss problem caused by cannot generating pulses in tunable laser during the tuning time consumed to convert to the desired wavelength when converting wavelengths of tunable lasers and optical filters and failing to pass signal from tunable optical filter to detector.

In this specification, a method for improving a low key rate, which is a problem of the conventional tunable laser-based plug-and-play quantum key distribution technology, is addressed. In order to solve this problem, the present specification constitutes a quantum cryptographic key distribution method, apparatus, and system that can solve the key rate loss problem due to the wavelength tuning time of the tunable laser (e.g., the example of FIG. 23) generated when the method of converting the wavelength of the light source to have a different wavelength for each pulse train and switching time for adjusting the detection wavelength of the optical filter in the process of periodically detecting the wavelength-converted pulse (e.g., the example of FIG. 24).

Figure 23:
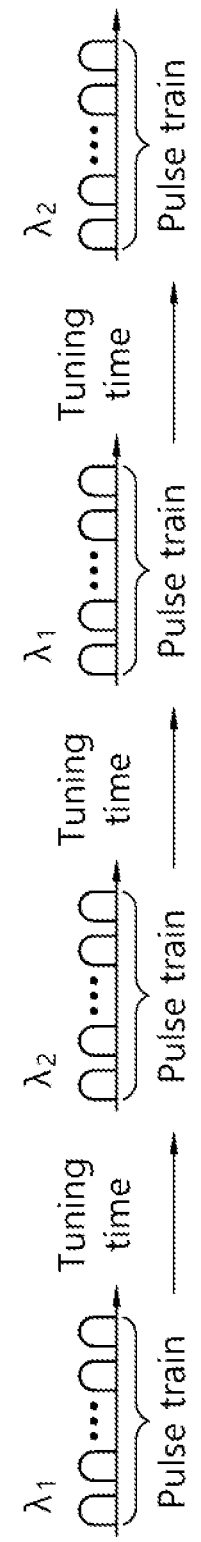
FIG. 23 schematically illustrates an example of wavelength conversion of a tunable laser.

FIG. 23 schematically illustrates an example of wavelength conversion of a tunable laser.

According to FIG. 23, a tunable laser (laser diode) may generate a pulse train having a first wavelength value and then generate a pulse train having a second wavelength value through a tuning time. Similarly, the tunable laser may generate a pulse train having a second wavelength value and then generate a pulse train having a first wavelength value through a tuning time. In addition, the tunable laser may generate a pulse train having a first wavelength value and then generate a pulse train having a second wavelength value through a tuning time again.

The above process can be repeated here, in the drawings, for convenience, it is shown that a laser diode generates a pulse train having a first wavelength value, then generating a pulse train having a second wavelength value, and then generating a pulse train having a first wavelength value again, this is merely an exemplary case. That is, the laser diode may generate a pulse train having a first wavelength value, a pulse train having a second wavelength value, a pulse train having a third wavelength value, a pulse train having a fourth wavelength value, and the like.

Figure 24:
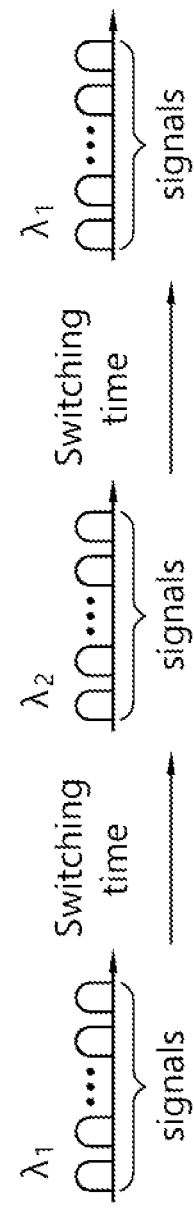
FIG. 24 schematically illustrates an example of wavelength conversion of a tunable optical filter.

FIG. 24 schematically illustrates an example of wavelength conversion of a tunable optical filter.

According to FIG. 24, the tunable optical filter may pass a pulse train having a first wavelength value and then pass a pulse train having a second wavelength value through a switching time. Similarly, the tunable laser may pass a pulse train having a second wavelength value and pass a pulse train having a first wavelength value through a switching time. In addition, the tunable laser may pass a pulse train having a first wavelength value and pass a pulse train having a second wavelength value again through a switching time.

The above process can be repeated here, in the drawing, for convenience, it is shown that the tunable filter passes a pulse train having a first wavelength value, passes a pulse train having a second wavelength value, and then passes a pulse train having a first wavelength value again, this is merely an exemplary case. That is, the tunable optical filter may pass a pulse train having a first wavelength value, a pulse train having a second wavelength value, a pulse train having a third wavelength value, a pulse train having a fourth wavelength value, and the like.

Accordingly, in the present specification, a key rate improvement technique of a two-way plug-and-play quantum cryptographic communication technique is dealt with. To this end, first of all, in the pulse generation process for key information generation, a method of having a different wavelength for each pulse train is applied through the use of a tunable laser, when this method is applied, two methods are proposed to solve the key rate loss problem caused by the inability to generate pulses during the wavelength conversion time. In addition, this proposes an effective method for converting the wavelength to be passed through the filter without time delay according to the changing time of the input signal wavelength that periodically changes in the tunable optical filter placed just before the detector and used to block the back scattering pulse in the process of detecting key information.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 25:
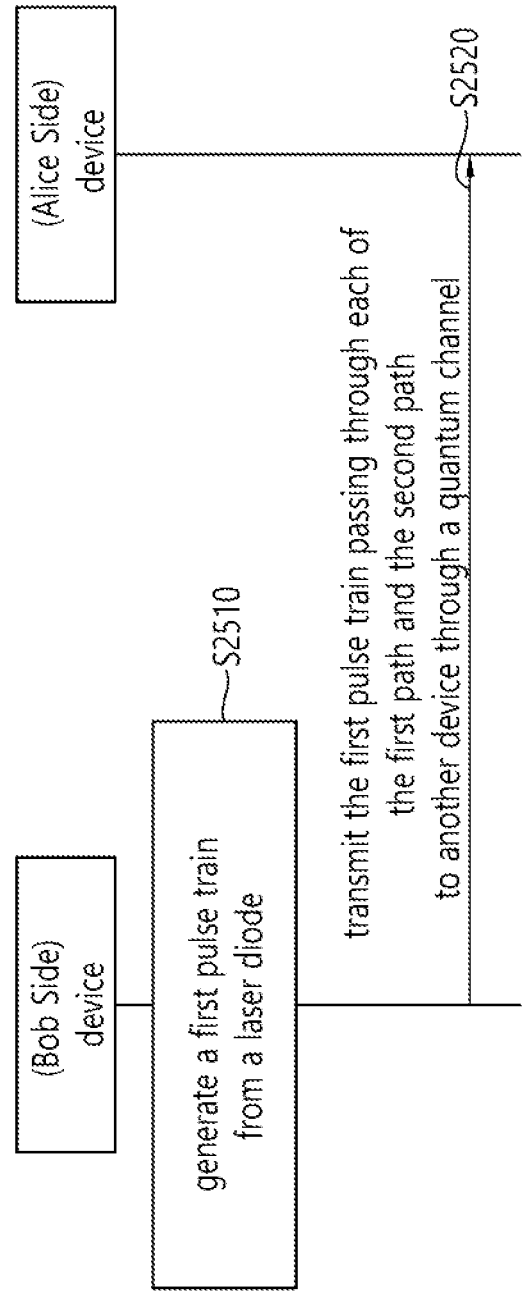
FIG. 25 is a flowchart of a method of transmitting a pulse train through a plurality of paths according to an embodiment of the present specification.

FIG. 25 is a flowchart of a method of transmitting a pulse train through a plurality of paths according to an embodiment of the present specification.

According to FIG. 25, the device may generate a first pulse train from a laser diode (S2510). As described above, the laser diode may be a device supporting wavelength tuning.

The device herein may refer to a device at the bob side described above/to be described later, and the device may correspond to the QKD receiver in FIG. 19 described above.

A more specific example in which the laser diode in the device generates the first pulse train will be described later for convenience of description.

The device may transmit the first pulse train passing through each of the first path and the second path to another device through a quantum channel (S2520).

For example, the second path may include N paths, N may have a value less than or equal to K, N and K may be natural numbers, and K may be the maximum number of the second paths.

Here, for example, the last pulse of the first pulse train may pass through the N paths while the laser diode is tuning the wavelength.

Here, for example, the length of each of the N paths can be determined based on the length of the first path, a value for which path the path is among the N paths, the time interval between pulses of the laser diode, and the speed of light in the optical fiber.

Here, for example, the value of K may be determined based on a time for tuning the wavelength of the laser diode and a time interval between pulses of the laser diode.

Meanwhile, as an example, the second path may include a storage line.

Here, for example, the first pulse train is branched and passes through the first path and the second path, the first pulse train passing through the second path may join in a beam splitter of the device after the first pulse train passing through the first path.

In one example, the device detects a second pulse train related to transmission of the first pulse train based on a first tunable filter and a second tunable filter, each of the first tunable filter and the second tunable filter may be an element that supports variably converting a wavelength passed through each of the first tunable filter and the second tunable filter.

Here, for example, during a switching time of the second tunable filter, the first tunable filter passes the second pulse train having a first wavelength, after a switching time of the second tunable filter, the first tunable filter may pass the second pulse train having a second wavelength.

In the case of the embodiments/examples described above, specific examples will be described later for convenience of description.

Meanwhile, the above-described device may be, for example, a device including a QKD receiving unit (i.e., a bob side) and a decoder, and an example thereof may be described through drawings as follows.

Figure 26:
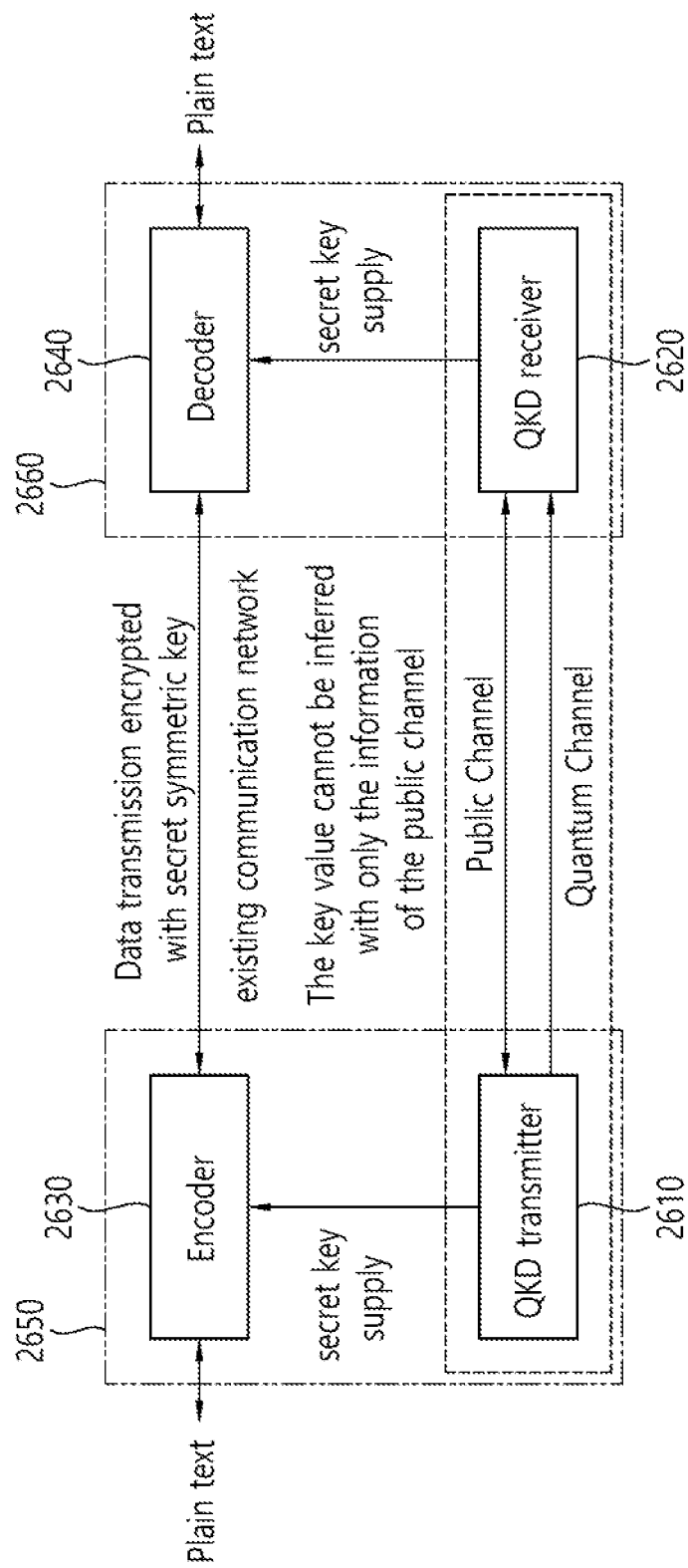
FIG. 26 schematically illustrates an example of a device according to an embodiment of the present specification.

FIG. 26 schematically illustrates an example of a device according to an embodiment of the present specification.

According to FIG. 26, a quantum key distribution (QKD) transmitter 2610 may perform communication by being connected to a QKD receiver 2620 through a public channel and a quantum channel.

At this time, the QKD transmitter 2610 may supply a secret key to the encrypter 2630, and the QKD receiver 2620 may also supply a secret key to the decryptor 2640. Here, plain text may be input/output to the encryptor 2630, the encryptor 2630 may transmit encrypted data with the decryptor 1940 (through an existing communication network) using a secret symmetric key. In addition, plain text may be input/output to the decoder 2640.

Here, the encryptor and decryptor may transmit/receive data through the communication network as described above, the communication network herein may mean, for example, a communication network in the 3GPP series (e.g., an LTE/LTE-A/NR based communication network), a communication network in the IEEE series, and the like.

Meanwhile, the encryptor 2630 and the QKD transmitter 2610 may be included in one device 2650, and the decryptor 2640 and the QKD receiver 2620 may also be included in one device 2660.

Hereinafter, an embodiment of a communication method for a case where a QKD receiver and a decoder are included in one device will be schematically described through drawings.

Figure 27:
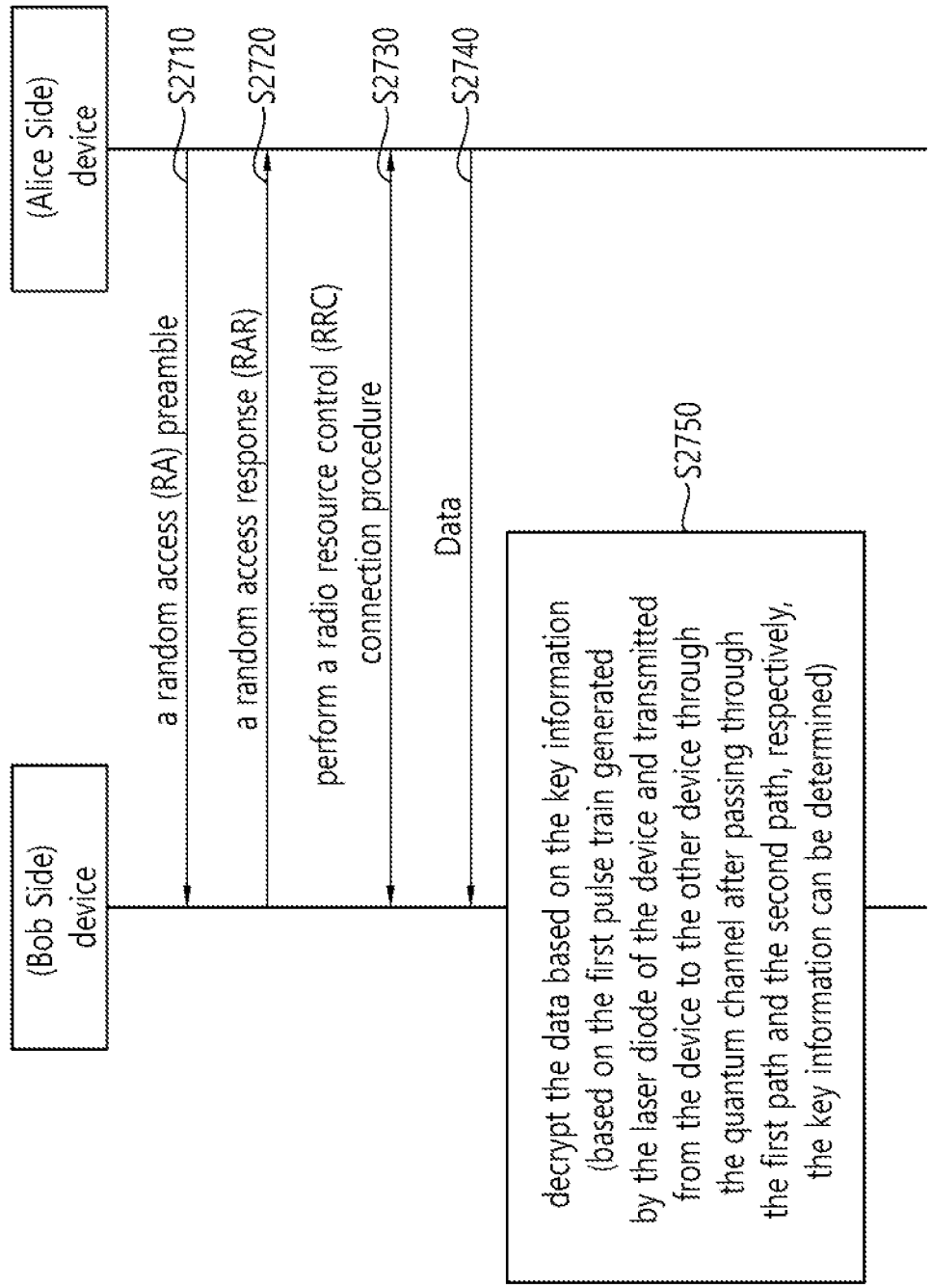
FIG. 27 is a flowchart of a method of transmitting a pulse train through a plurality of paths according to another embodiment of the present specification.

FIG. 27 is a flowchart of a method of transmitting a pulse train through a plurality of paths according to another embodiment of the present specification.

According to FIG. 27, a device may receive a random access (RA) preamble from another device (S2710). As described above, the device herein may correspond to a device including a QKD receiver and a decoder, and may mean a type of device at the bob side. In addition, the other device may correspond to the device including the QKD transmission unit and the encoder described above, and may mean a kind of Alice-side device. Since a detailed description of this is as described above and/or described later, repeated description of overlapping contents will be omitted for convenience of explanation.

The device may transmit a random access response (RAR) to the other device in response to the RA preamble (S2720). Since a detailed description of this is as described above and/or described later, repeated description of overlapping contents will be omitted for convenience of explanation.

The device may perform a radio resource control (RRC) connection procedure with the other device (S2730). Since a detailed description of this is as described above and/or described later, repeated description of overlapping contents will be omitted for convenience of explanation.

The device may receive data from the other device (S2740). Since a detailed description of this is as described above and/or described later, repeated description of overlapping contents will be omitted for convenience of explanation.

The device may decrypt the data based on the key information (S2750). Since a detailed description of this is as described above and/or described later, repeated description of overlapping contents will be omitted for convenience of explanation.

Here, based on the first pulse train generated by the laser diode of the device and transmitted from the device to the other device through the quantum channel after passing through the first path and the second path, respectively, the key information can be determined, more specific example of this will be described later.

Hereinafter, the embodiments of the present specification will be described in more detail.

1. Key Rate Improvement Technique in Signal Generation Based on Tunable Laser Diode 1-1. How to Use N Multipath and Optical Switches In the above specification, in a two-way plug and play quantum cryptographic communication system, the long tuning time problem that occurs in the wavelength conversion process of the tunable laser-based signal pulse generator used for the purpose of minimizing the time delay to prevent the occurrence of back scattering pulses between the current pulse train consisting of N pulses and the next pulse train is addressed.

Figure 28:
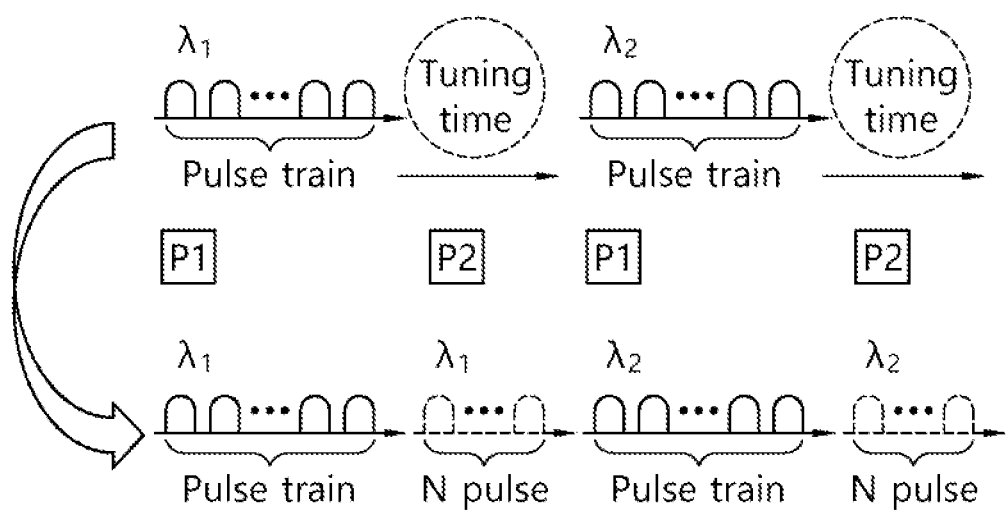
FIG. 28 schematically shows a situation of a wavelength tuning time problem of a tunable laser and a situation after solving the problem.

FIG. 28 schematically shows a situation of a wavelength tuning time problem of a tunable laser and a situation after solving the problem.

In the existing tunable laser-based light source generation technique, as shown in FIG. 28, a wavelength tuning time is required in the process of converting the generated wavelength from $\lambda\_1$ to $\lambda\_2$, during this time, a pulse of a desired wavelength cannot be generated, resulting in a key rate loss. Since commercial tunable lasers capable of generating 1550 nm wavelengths currently used in wired QKD are generally found to have a wavelength conversion speed range of nm per second, as for the tuning time, it can be estimated that approximately ms units of time will be consumed. That is, the wavelength tuning time has a non-negligible ratio compared to the pulse train generation time.

Therefore, in order to solve the key rate reduction problem caused by this, in this specification, first, a method of improving the key rate was proposed by using k multipaths and optical switches to additionally generate pulses during the wavelength tuning time, the configuration of the overall specification technique is shown in the figure below.

Figure 29:
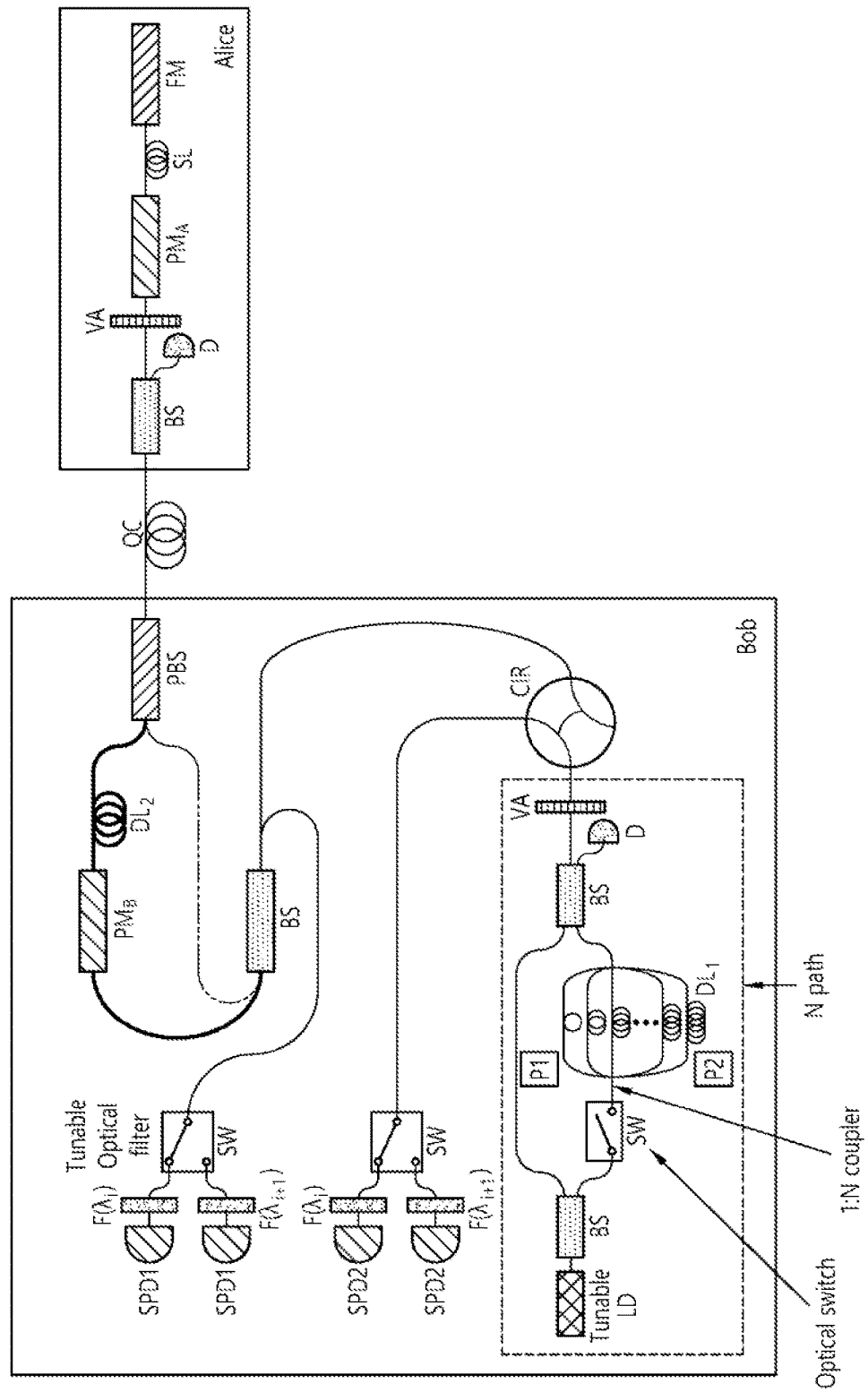
FIG. 29 schematically illustrates an example of a wavelength conversion latency improvement technique of tunable laser-based QKD using multipath and optical switches.

FIG. 29 schematically illustrates an example of a wavelength conversion latency improvement technique of tunable laser-based QKD using multipath and optical switches.

In this specification, after the pulse of the tunable LD passes through the P1 path, the pulse proceeds through the P2 path, and the detailed signal generation process is as follows.

(1) After generating N pulses having a wavelength of $\lambda\_i$ in the tunable LD, they are transmitted through the P1 path (above). At this time, the P2 path (below) remains switched off.

(2) During the wavelength tuning time for wavelength generation of $\lambda\_(i+1)$ in the subsequent tunable LD, no pulse passes through the P1 path.

During conversion from $\lambda\_i$ to $\lambda\_(i+1)$ in the tunable LD, the following processes proceed in order through the path of P2.

(2-1) The switch is turned on at the time when the last N-th pulse among pulses having a wavelength of $\lambda\_i$ passes through the BS and is transmitted to the P2 path (below).

(2-2) Pulses passing through the optical switch are distributed to k paths through a 1:k coupler.

(2-3) Each path has a delay line of different length, and the path difference is constantly increased.

(At this time, the same time difference as the existing pulse is generated between the pulses entering each path.)

At this time, the maximum number of paths generated in P2 may be as follows.

$$k = \left\lfloor \frac{\text{tuning time of tunable } LD}{\text{time interval between pulses of tunable } LD(= \Delta t)} \right\rfloor \quad \text{[Equation 13]}$$

That is, the value of K may be determined based on a time for tuning the wavelength of the laser diode and a time interval between pulses of the laser diode.

In addition, the length of each path of DL_1 may be described as follows through drawings.

Figure 30:
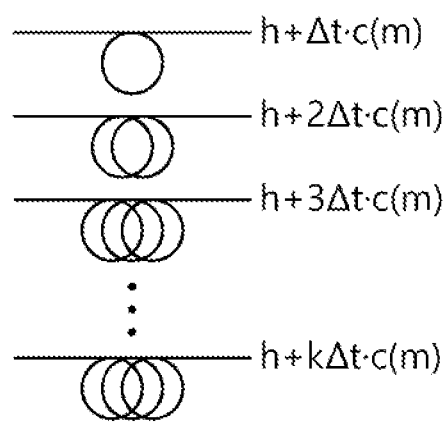
FIG. 30 schematically shows an example of the length of each path of DL_1.

FIG. 30 schematically shows an example of the length of each path of DL_1.

According to FIG. 30, the length of each of the N paths can be determined based on length of the first path, a value indicating which path the path is among the N paths, a time interval between pulses of the laser diode and speed of light in fiber.

Each parameter in the drawing may be as follows.

c: the speed of light in fiber=2×10^8 (m/s), h: length of the first path (e.g. P1 path length)

(2-4) k pulses according to the length of each path are sequentially output through the k:1 coupler during the wavelength conversion time of the tunable LD.

(2-5) After the detector detects the difference in intensity of the pulses passing through the P1 path and the P2 path, VA attenuates the difference corresponding to the value and sends it out.

In the case of this method, since only the minimum number of paths corresponding to the tuning time of the laser needs to be generated, it is possible to configure only the small size of DL_1, especially when the tuning time is not long.

1-2. How to Use a Single Storage Line and Attenuator

Another specification technique is a method as shown in the figure below in which a storage line having a length corresponding to the tuning time is configured in parallel with the original path.

Figure 31:
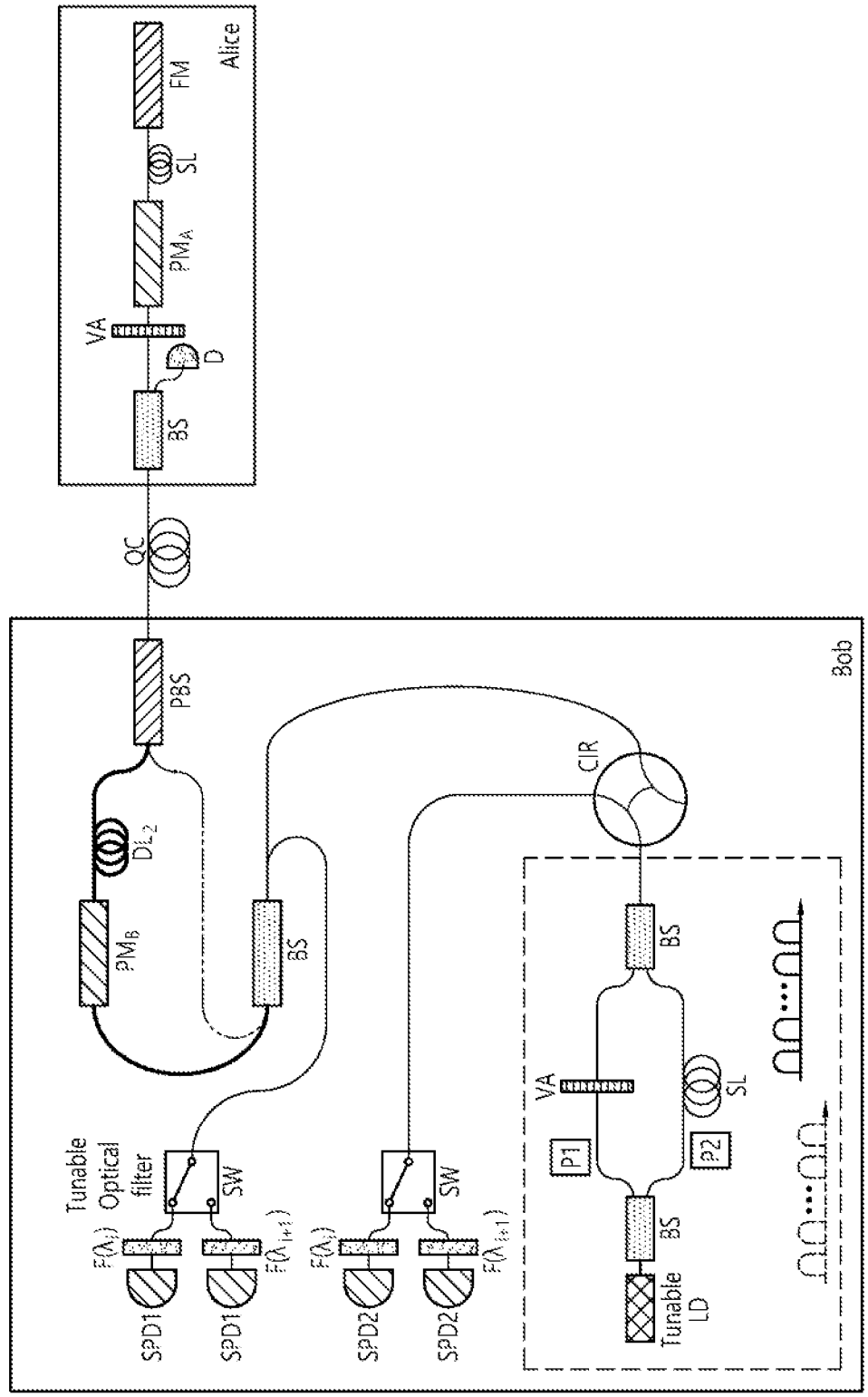
FIG. 31 schematically illustrates an example of a wavelength conversion delay time improvement technique of tunable laser-based QKD using a single delay line and an attenuator.

FIG. 31 schematically illustrates an example of a wavelength conversion delay time improvement technique of tunable laser-based QKD using a single delay line and an attenuator.

This method is a method that can prevent key rate loss by adding a long single path when the tuning time of the tunable laser is long. In the technique of this specification, if the tuning time is shorter than the pulse train generation time, pulses can be generated without key rate loss. tuning time equal to the generation time of the pulse train generated by the tunable laser can be secured, since all pulses can be attenuated to the same value in a variable attenuator (VA), it has the advantage that the control of the VA is simple.

A detailed process for signal generation in the technique of this specification is as follows.

(1) After generating N pulses having a wavelength of λ_i in the tunable LD, each pulse train is transmitted through two paths, P1 and P2.

(2) On the side passing through the variable attenuator, the strength of the signal passing through the upper path is attenuated by the loss of the lower path so that the pulses passing through the upper and lower paths are transmitted with the same power.

(3) On the side passing through the storage line (SL), after N pulses pass through the upper path, an SL with a length corresponding to the length of k pulses coming from the lower side is used, its length can be expressed as below.

$$l_{SL} = \text{the number of pulses}(=N) \times \text{the speed} \quad \text{[Equation 14]}$$
$$\text{of optical pulse in the fibre}\left(=2\times\frac{10^8 m}{s}\right)\times\frac{1}{f_{Laser}}$$

(4) Before the N+1th pulse to the 2Nth pulse all pass through the lower path, tuning for generating a wavelength of λ_(i+1) is performed in the tunable LD.

(5) From the 2N+1th pulse, pulses with a wavelength of λ_(i+1) are generated in the tunable LD, and the above steps (2) to (4) are repeated.

2. Key Rate Improvement Method in Signal Detection Based on Tunable Laser Diode-Method Using Two Additional Detectors and Tunable Optical Filter In the quantum cryptography communication technique based on tunable LD, since the detector must detect key information having a different wavelength at each time interval corresponding to the length of the pulse train generated by the tunable LD, by placing a tunable optical filter just before the single photon detectors (SPD1, 2), it is necessary to continuously perform wavelength switching so that only the detection wavelength can pass. However, after a signal sequence having a wavelength of λ_i is detected, a signal sequence having a wavelength of λ_(i+1) must pass through the filter, since the wavelength conversion time of the tunable filter is required for this, there is a problem in that even if a signal having a wavelength of λ_(i+1) enters during this time, it cannot pass.

Therefore, in the present specification, a method capable of detecting through a detector even during filter switching time is proposed in order to minimize the key rate loss caused by this.

Figure 32:
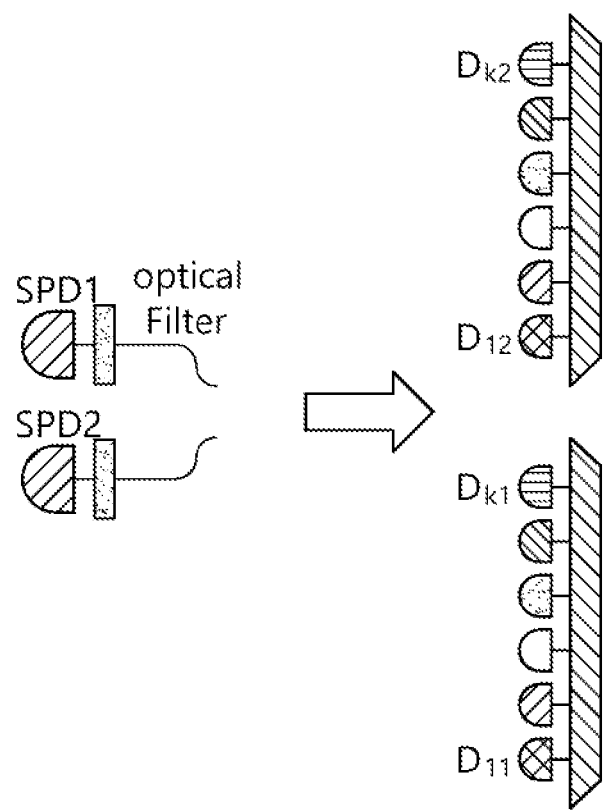
FIG. 32 schematically illustrates an example of a demultiplexing technique for solving a delay time problem due to wavelength switching of a tunable filter.

FIG. 32 schematically illustrates an example of a demultiplexing technique for solving a delay time problem due to wavelength switching of a tunable filter.

Easiest way to avoid key rate loss due to wavelength conversion time delay in tunable optical filters is to arrange single photon detectors (SPDs) corresponding to twice the number k of wavelengths to be used in two Demux and tunable LD as shown in the drawing. Through this, it is possible to prevent a key rate loss due to the use of multi-wavelength signals because the signal can be detected by the single photon detector of a predetermined path of the Demux according to the wavelength of the input signal.

However, since this method requires more wavelength conversions to be applied as the length of the quantum channel is longer, it has limitations such as volume and cost due to the increase in the number of additional lasers on the bob side and the increase in the complexity of the control part.

Figure 33:
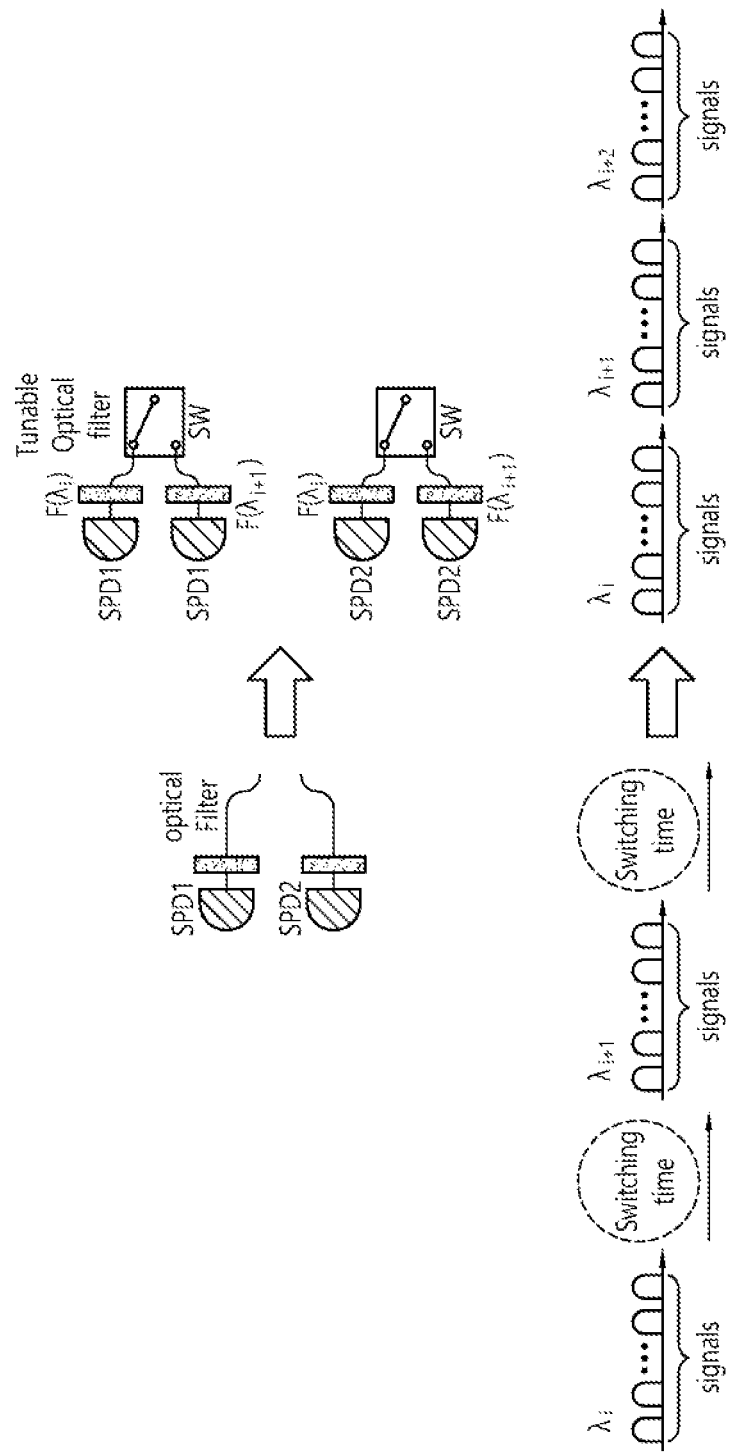
FIG. 33 schematically illustrates a key rate deterioration problem due to a wavelength switching time of a tunable filter and a solution thereof.

FIG. 33 schematically illustrates a key rate deterioration problem due to a wavelength switching time of a tunable filter and a solution thereof.

According to FIG. 33, in order to solve the above problem, two additional SPDs and tunable filters are applied, when a signal having a wavelength of λ_(i+1) starts to come in, a method of switching to a path capable of passing the next passing wavelength through a 1×2 optical switch may be used. Since there are current commercial 1×2 optical switches with a path switching speed of 10 ns or less, since the time corresponding to the inter-pulse interval of the signal entering the SPD can be made shorter, the time delay due to the optical switch may not occur.

Therefore, while a pulse train with a wavelength of $\lambda\_i$ is being measured in the SPD, in another SPD, after changing the pass wavelength of the optical filter to $\lambda\_(i+1)$, which is the wavelength of the pulse train to be detected next, if the path of the optical switch is changed at the timing when the pulse with the wavelength change is input, it is possible to overcome the key rate degradation problem due to the switching time of the filter.

According to the present specification, there are expected effects as follows.

In this specification, an efficient method for improving a low shifted key rate, which was a problem of the existing plug-and-play quantum cryptography communication scheme, was presented. To this end, a method of using a tunable laser capable of converting the wavelength of a light source was presented, a method to solve two problems that may occur in this process, the tuning time delay of the tunable laser and the wavelength switching time delay of the tunable optical filter, is proposed.

In this technique, the shifted key rate can be increased by removing key rate loss equivalent to the following equation corresponding to the shifted key rate loss ratio of the conventional tunable laser-based technique caused by the above two problems.

$$\left(1 - \frac{Int[f \cdot t_{sw} - 1]}{N}\right)\left(1 - \frac{Int[f \cdot t_{tn} - 1]}{N}\right) \quad [\text{Equation 15}]$$

(1) Shifted Key Rate (=R_c) of Existing Tunable LD-Based Plug and Play QKD Scheme $$R_c = \frac{1}{2} f \mu n_f n_B n_D 10^{-\frac{\alpha_{filter}}{10}} \times \left(1 - \frac{Int[f \cdot t_{sw} - 1]}{N}\right)\left(1 - \frac{Int[f \cdot t_{tn} - 1]}{N}\right) \quad [\text{Equation 16}]$$

In the above equation, each parameter can be defined as follows.

f: pulse repetition rate
μ: mean photon number (approximate value 0.1)
n_f: fiber transmission coefficient, n_f=10^(−α_1*L_d/10)(α_1: 1550 nm fiber loss, 0.2 dB/km, L_d: distance)
n_B: Total loss inside bob, n_B=10^(−L_Bob/10)
n_D: Detection efficiency of SPD
α filter: the loss of the filter (dB)
t_sw: Tunable filter switching time
t_tn: Wavelength tuning time for tunable laser
N: the number of pulses=2f*L_s/v_g(L_s: length of storage line, v_g=2×10^8 (m/s))
(2) The Shifted Key Rate of the Technique Herein (=R_Prop)

$$R_p = \frac{1}{2} f \mu n_f n_B n_D 10^{-\frac{\alpha_{filter}}{10}} \quad [\text{Equation 17}]$$

Optical filter coefficient: n_sw=10^(−α_f/10), (α_filter: the loss of filter)

On the other hand, if the above-described embodiments are described again from various points of view, it may be as follows.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 34:
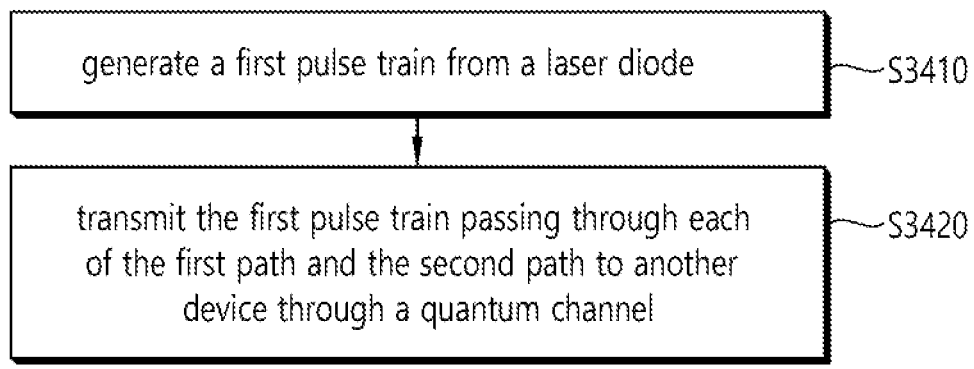
FIG. 34 is a flowchart of a method of transmitting a pulse train through a plurality of paths, performed by Bob Side's device, according to an embodiment of the present specification.

FIG. 34 is a flowchart of a method of transmitting a pulse train through a plurality of paths, performed by Bob Side's device, according to an embodiment of the present specification.

According to FIG. 34, the device may generate a first pulse train from a laser diode (S3410). Here, since a more specific example of this embodiment is as described above, repeated description of redundant content will be omitted for convenience of description.

The device may transmit the first pulse train passing through each of the first path and the second path to another device through a quantum channel (S3420). Here, since a more specific example of this embodiment is as described above, repeated description of redundant content will be omitted for convenience of description.

Figure 35:
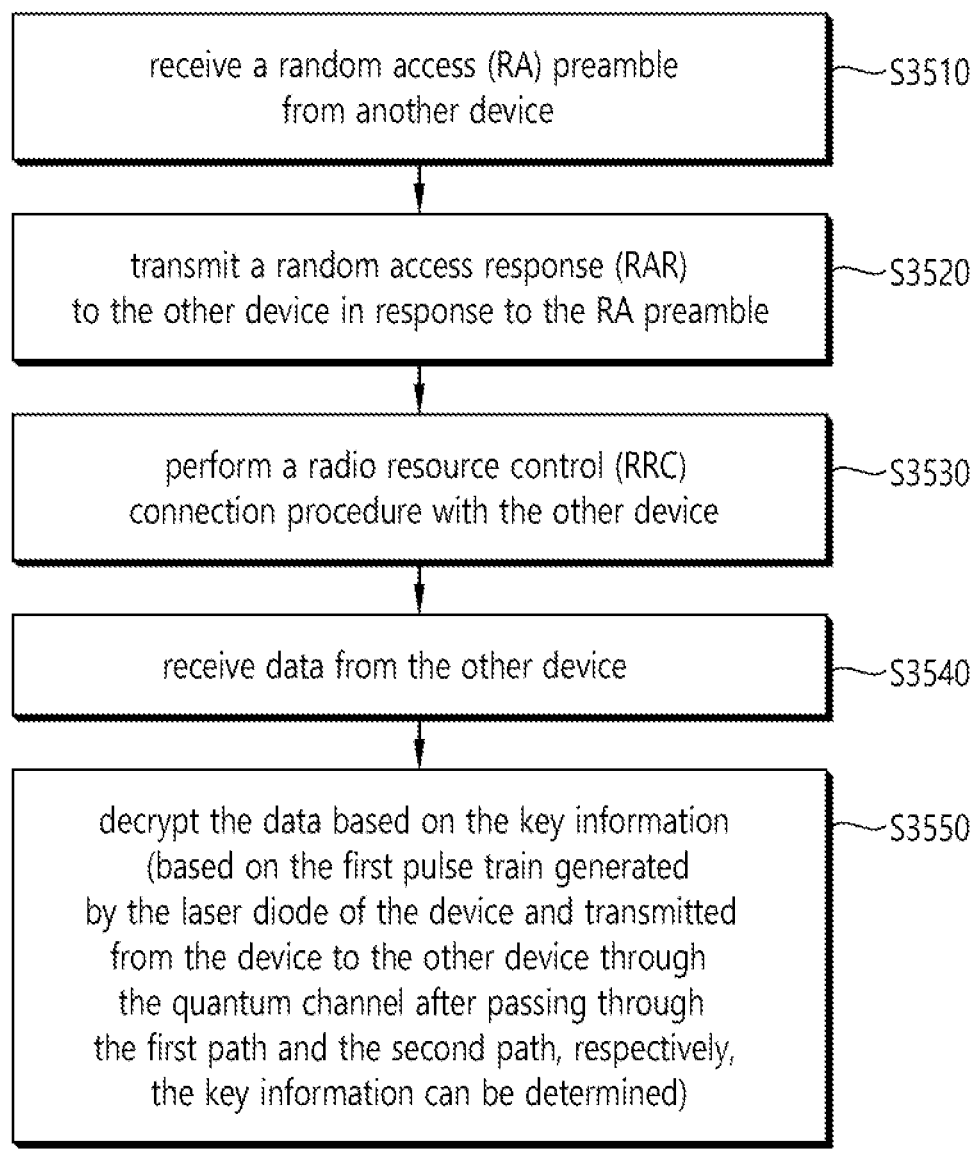
FIG. 35 is a flowchart of a method of transmitting a pulse train through a plurality of paths, performed by Bob Side's device, according to another embodiment of the present specification.

FIG. 35 is a flowchart of a method of transmitting a pulse train through a plurality of paths, performed by Bob Side's device, according to another embodiment of the present specification.

According to FIG. 35, a device may receive a random access (RA) preamble from another device (S3510). Here, since a more specific example of this embodiment is as described above, repeated description of redundant content will be omitted for convenience of description.

The device may transmit a random access response (RAR) to the other device in response to the RA preamble (S3520). Here, since a more specific example of this embodiment is as described above, repeated description of redundant content will be omitted for convenience of description.

The device may perform a radio resource control (RRC) connection procedure with the other device (S3530). Here, since a more specific example of this embodiment is as described above, repeated description of redundant content will be omitted for convenience of description.

The device may receive data from the other device (S3540). Here, since a more specific example of this embodiment is as described above, repeated description of redundant content will be omitted for convenience of description.

The device may decrypt the data based on the key information (S3550). Here, based on the first pulse train generated by the laser diode of the device and transmitted from the device to the other device through the quantum channel after passing through the first path and the second path, respectively, the key information can be determined, a more specific example of this will be described later. Here, since a more specific example of this embodiment is as described above, repeated description of redundant content will be omitted for convenience of description.

Meanwhile, the device proposed in this specification may be as described in the drawings below. A device in the drawing below may correspond to a device that simplifies the proposal of the present specification described above.

Hereinafter, for a better understanding of the examples of the present specification, the disclosure of the present specification will be described through drawings. The following drawings are made to explain a specific example of the present specification. Since the names of specific devices or names of specific signals/messages/fields described in the drawings are provided as examples, the technical features of the present specification are not limited to the specific names used in the drawings below.

Figure 36:
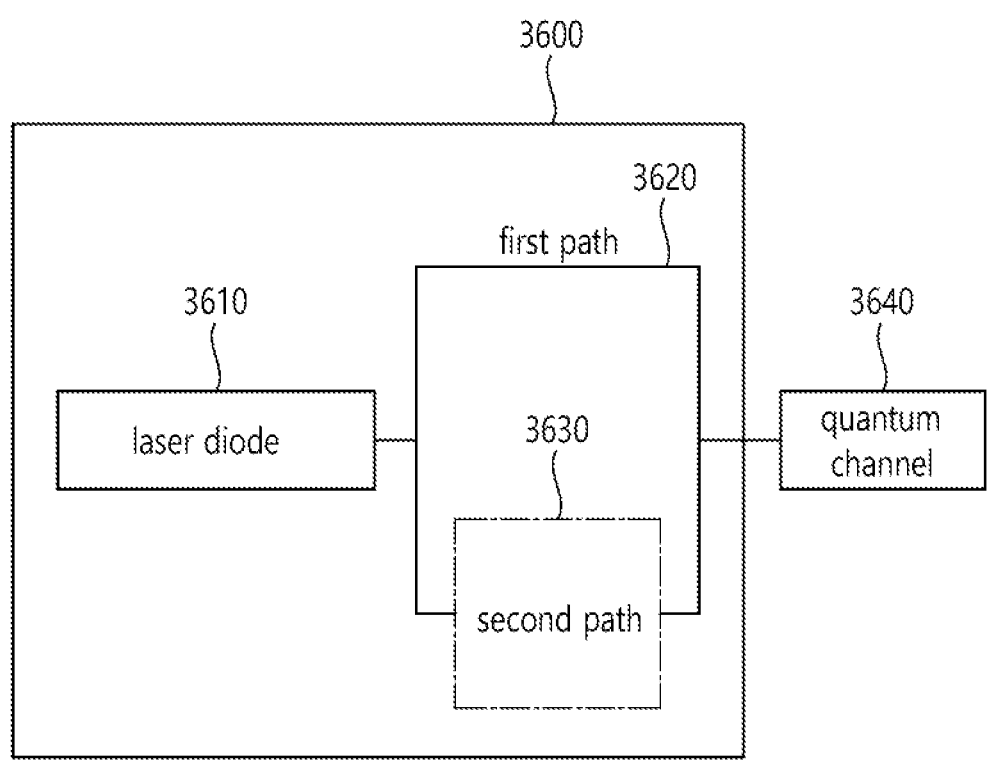
FIG. 36 is an example of a block diagram of an apparatus for transmitting a pulse train through a plurality of paths, from the perspective of Bob Side's apparatus, according to an embodiment of the present specification.

FIG. 36 is an example of a block diagram of an apparatus for transmitting a pulse train through a plurality of paths, from the perspective of Bob Side's apparatus, according to an embodiment of the present specification.

According to FIG. 36, a device 3600 may include a laser diode 3610, a first path 3620, and a second path 3630, the device 3600 may be connected to other devices through the quantum channel 3640.

Here, as described above, the device 3600 includes a laser diode 3610 generating a first pulse train and a first path 3620 and a second path 3630, the device 3600 may transmit the first pulse train passing through each of the first path 3620 and the second path 3630 to another device through the quantum channel 3640.

Here, since a more specific example of this embodiment is as described above, repeated description of redundant content will be omitted for convenience of description.

The device proposed in this specification can be described in relation to a control device as follows.

Figure 37:
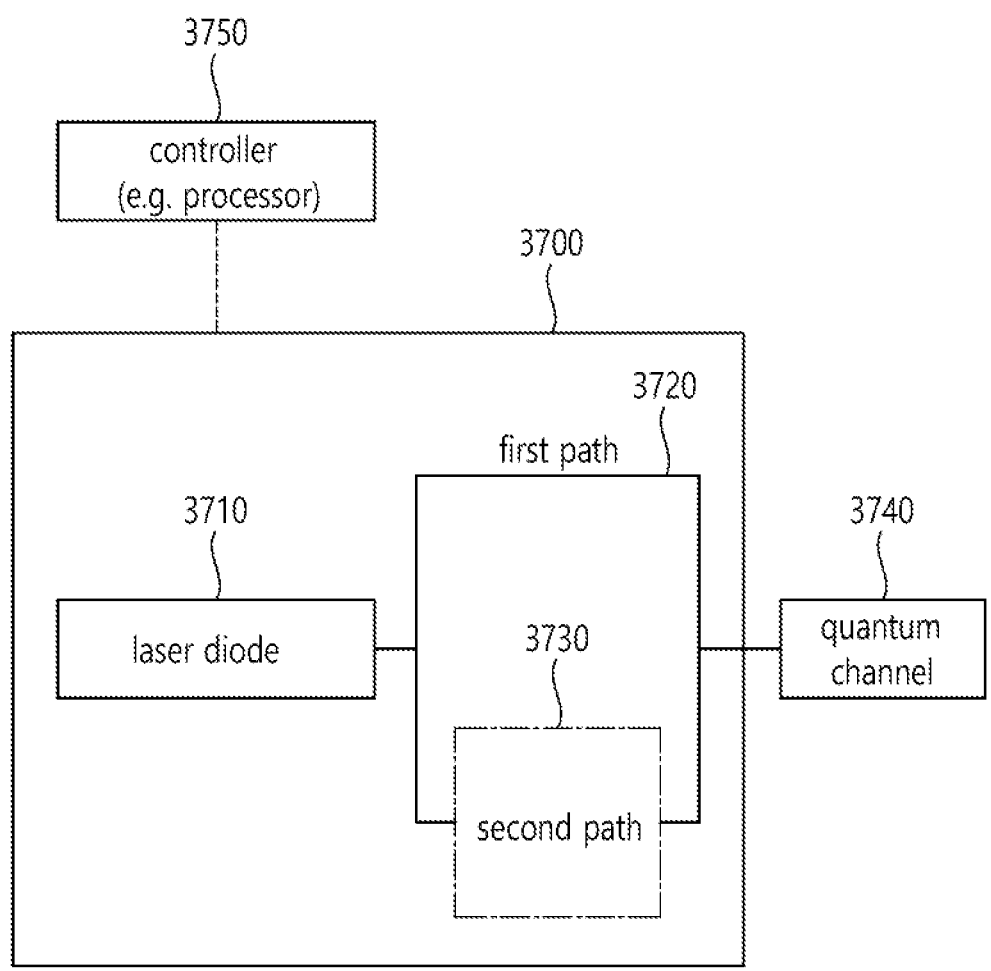
FIG. 37 is an example of a block diagram of a device for transmitting a pulse train through a plurality of paths, from the point of view of Bob Side's device, according to another embodiment of the present specification.

FIG. 37 is an example of a block diagram of a device for transmitting a pulse train through a plurality of paths, from the point of view of Bob Side's device, according to another embodiment of the present specification.

According to FIG. 37, a device 3700 may include a laser diode 3710, a first path 3720, and a second path 3730, the device 3700 may be connected to other devices through the quantum channel 3740.

Meanwhile, the device 3700 may be controlled by the control device 3750 (e.g. processor).

For example, the at least one processor may be configured to control the transceiver to receive a random access (RA) preamble from another apparatus, control the transceiver to transmit a random access response (RAR) to the another apparatus in response to the RA preamble, perform a radio resource control (RRC) connection procedure with the another apparatus, control the transceiver to receive data from the another apparatus and decode the data based on key information, wherein the apparatus includes a laser diode, a first path and a second path, wherein, based on that the first pulse train is generated in a laser diode of the apparatus and the first pulse train is transmitted from the apparatus to the another apparatus through a quantum channel after respectively passing through a first path and a second path, the key information is determined.

Meanwhile, for example, at least one computer readable medium containing instructions based on being executed by at least one processor is provided, wherein the at least one processor is configured to control a transceiver to receive a random access (RA) preamble from another apparatus, control the transceiver to transmit a random access response (RAR) to the another apparatus in response to the RA preamble, perform a radio resource control (RRC) connection procedure with the another apparatus, control the transceiver to receive data from the another apparatus and decode the data based on key information, wherein, based on that the first pulse train is generated in a laser diode of the apparatus and the first pulse train is transmitted from the apparatus to the another apparatus through a quantum channel after respectively passing through a first path and a second path, the key information is determined.

As another example, a control device may be included in the device provided in this specification.

Figure 38:
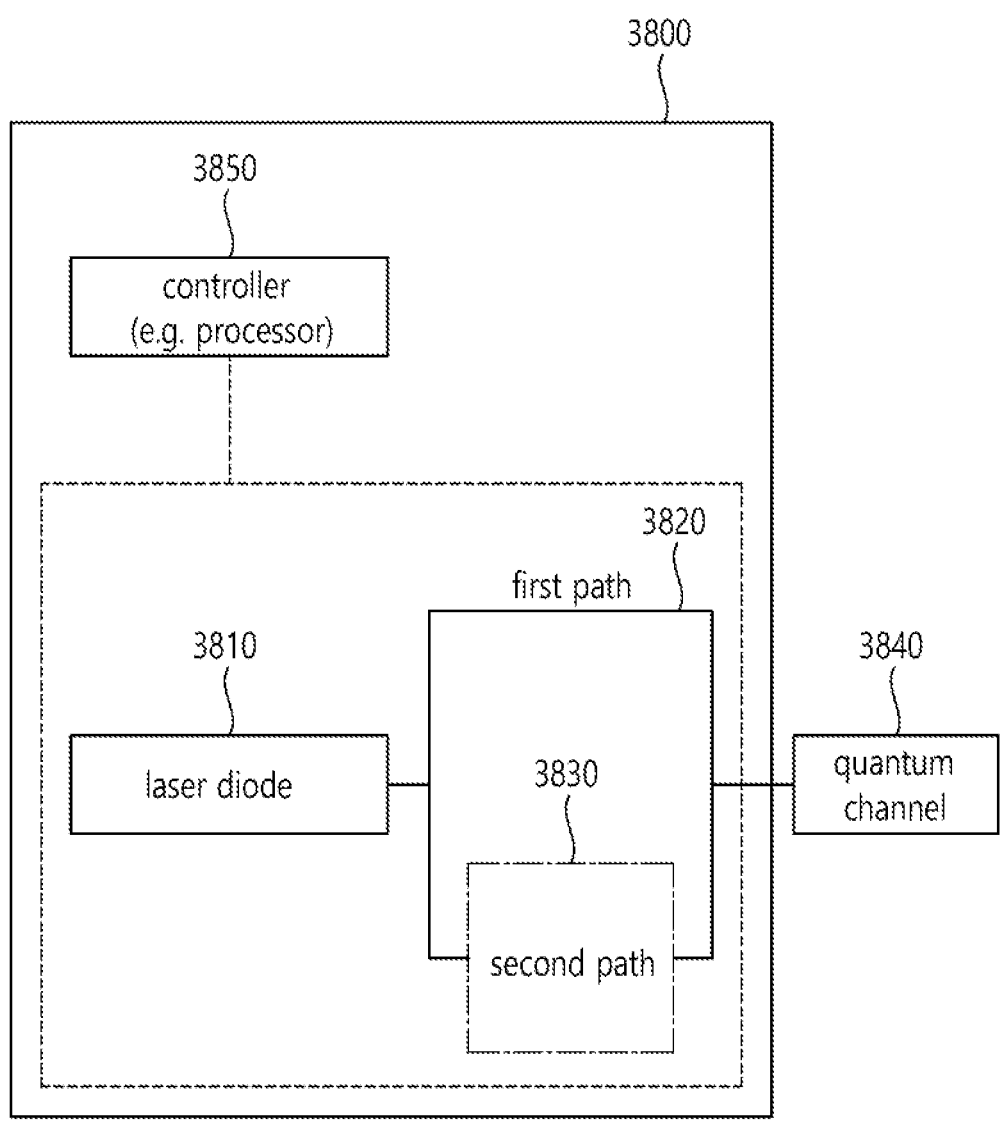
FIG. 38 is an example of a block diagram of a device for transmitting a pulse train through a plurality of paths, from the point of view of Bob Side's device, according to another embodiment of the present specification.

FIG. 38 is an example of a block diagram of a device for transmitting a pulse train through a plurality of paths, from the point of view of Bob Side's device, according to another embodiment of the present specification.

According to FIG. 38, a device 3800 may include a laser diode 3810, a first path 3820, and a second path 3830, the device 3800 may be connected to other devices through the quantum channel 3840. In addition, the above device 3800 may include a control device 3850 (e.g. processor).

Here, since a more specific example of this embodiment is as described above, repeated description of redundant content will be omitted for convenience of description.

Figure 39:
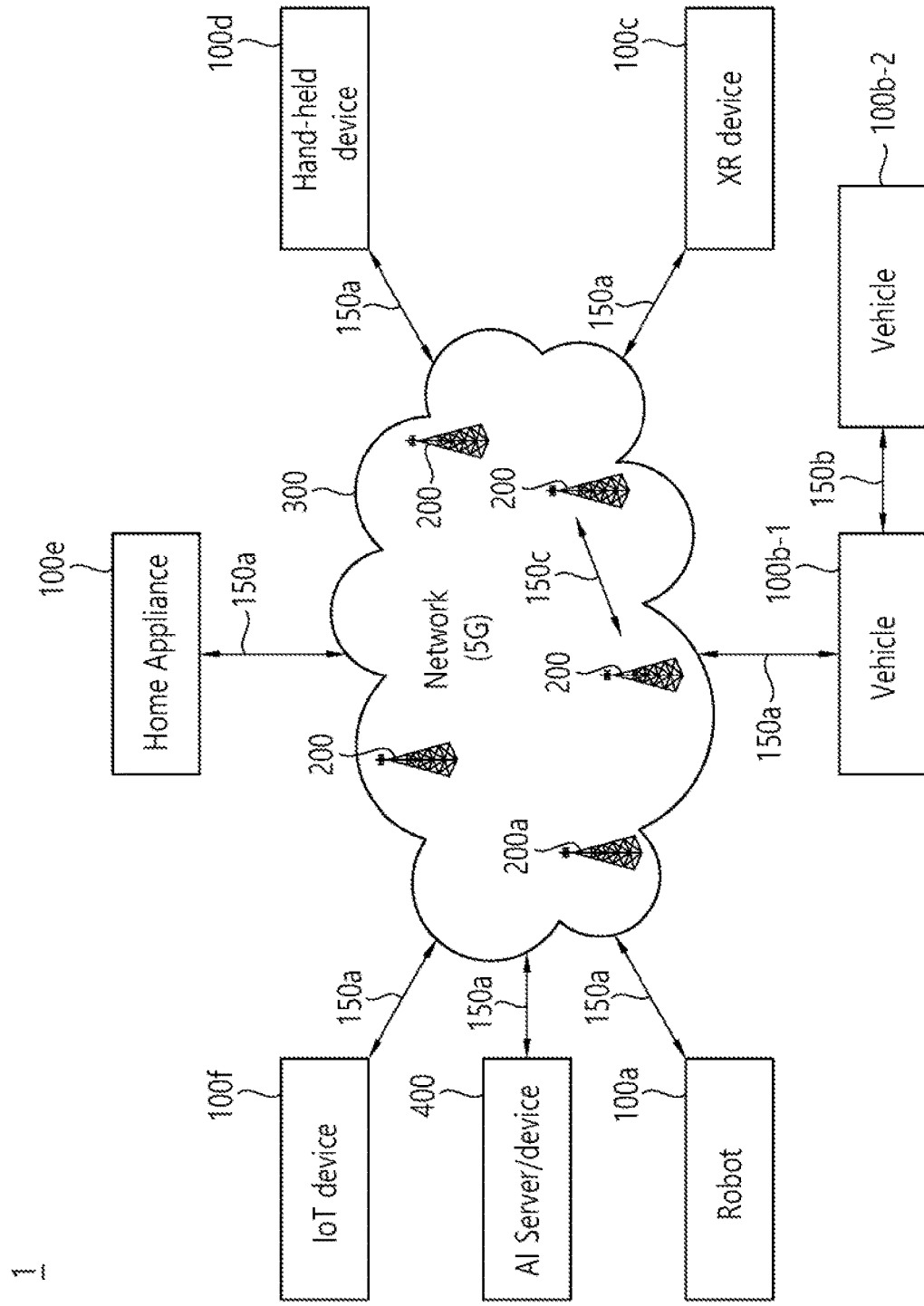
FIG. 39 illustrates the communication system 1 applied to this specification.

FIG. 39 shows a communication system (1), in accordance with an embodiment of the present disclosure.

Referring to FIG. 39, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an extended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 5 below. For convenience of explanation, among the frequency ranges used in the NR system, FR1 may mean "sub 6 GHz range" and FR2 may mean "above 6 GHz range" and may be called millimeter wave (mmW).

TABLE 5

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As described above, the number of frequency ranges of the NR system can be changed. For example, FR1 may include a band of 410 MHz to 7125 MHz as shown in Table 6 below. That is, FR1 may include a frequency band of 6 GHz (or 5850, 5900, 5925 MHZ, etc.) or higher. For example, a frequency band of 6 GHz (or 5850, 5900, 5925 MHZ, etc.) or higher included in FR1 may include an unlicensed band. The unlicensed band may be used for various purposes, and may be used, for example, for vehicle communication (eg, autonomous driving).

TABLE 6

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Hereinafter, an example of a wireless device to which the present specification is applied will be described.

Figure 40:
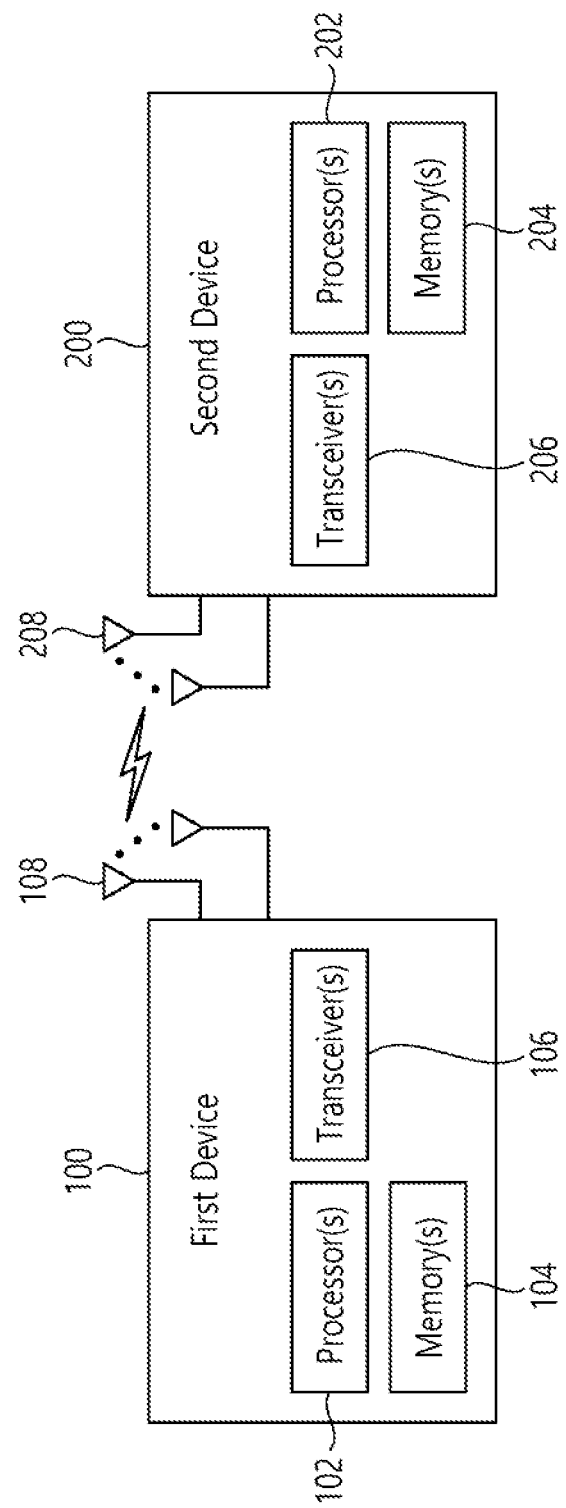
FIG. 40 illustrates a wireless device applicable to this specification.

FIG. 40 shows wireless devices, in accordance with an embodiment of the present disclosure.

Referring to FIG. 40, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 39.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection. The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 41:
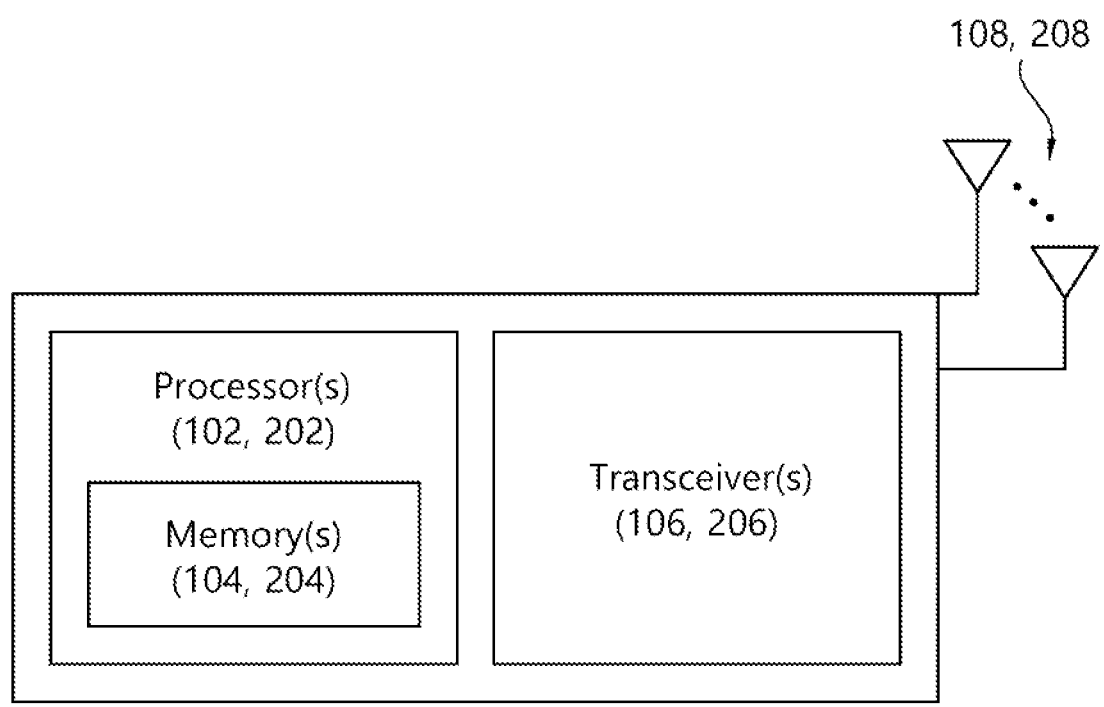
FIG. 41 shows another example of a wireless device that can be applied to this specification.

FIG. 41 shows another example of a wireless device that can be applied to this specification.

According to FIG. 41, a wireless device may include at least one processor (102, 202), at least one memory (104, 204), at least one transceiver (106, 206), and one or more antennas (108, 208).

As a difference between the example of the wireless device described above in FIG. 40 and the example of the wireless device in FIG. 41, in FIG. 40, the processors 102 and 202 and the memories 104 and 204 are separated, but in the example of FIG. 41, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 42:
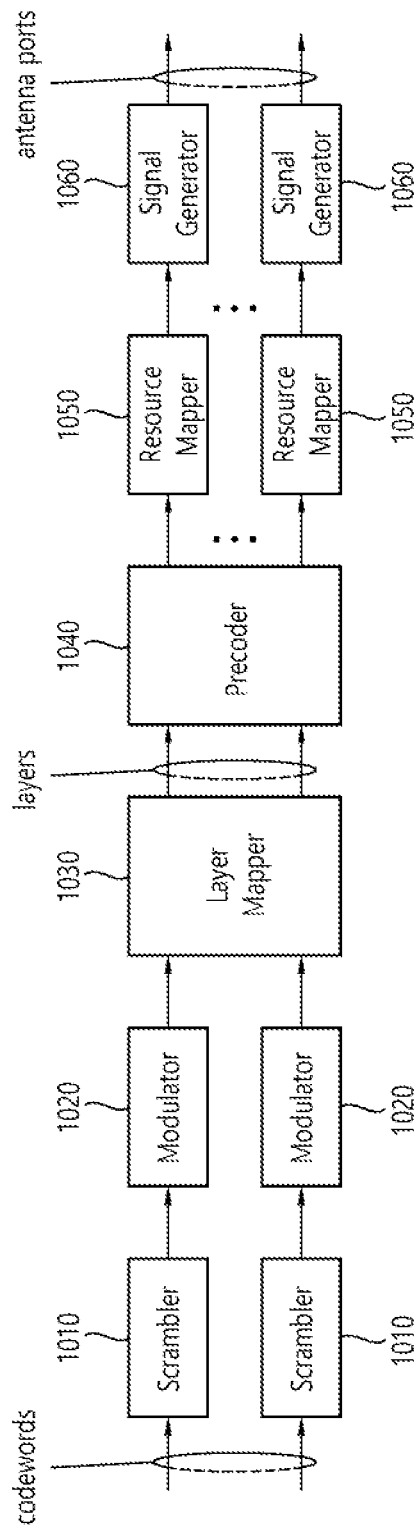
FIG. 42 illustrates a signal processing circuit for a transmission signal.

FIG. 42 shows a signal process circuit for a transmission signal, in accordance with an embodiment of the present disclosure.

Referring to FIG. 42, a signal processing circuit (1000) may include scramblers (1010), modulators (1020), a layer mapper (1030), a precoder (1040), resource mappers (1050), and signal generators (1060). An operation/function of FIG. 42 may be performed, without being limited to, the processors (102, 202) and/or the transceivers (106, 206) of FIG. 40. Hardware elements of FIG. 42 may be implemented by the processors (102, 202) and/or the transceivers (106, 206) of FIG. 40. For example, blocks 1010~1060 may be implemented by the processors (102, 202) of FIG. 40. Alternatively, the blocks 1010~1050 may be implemented by the processors (102, 202) of FIG. 40 and the block 1060 may be implemented by the transceivers (106, 206) of FIG. 40.

Codewords may be converted into radio signals via the signal processing circuit (1000) of FIG. 42. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 42. For example, the wireless devices (e.g., 100, 200 of FIG. 40) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present specification is applied will be described.

Figure 43:
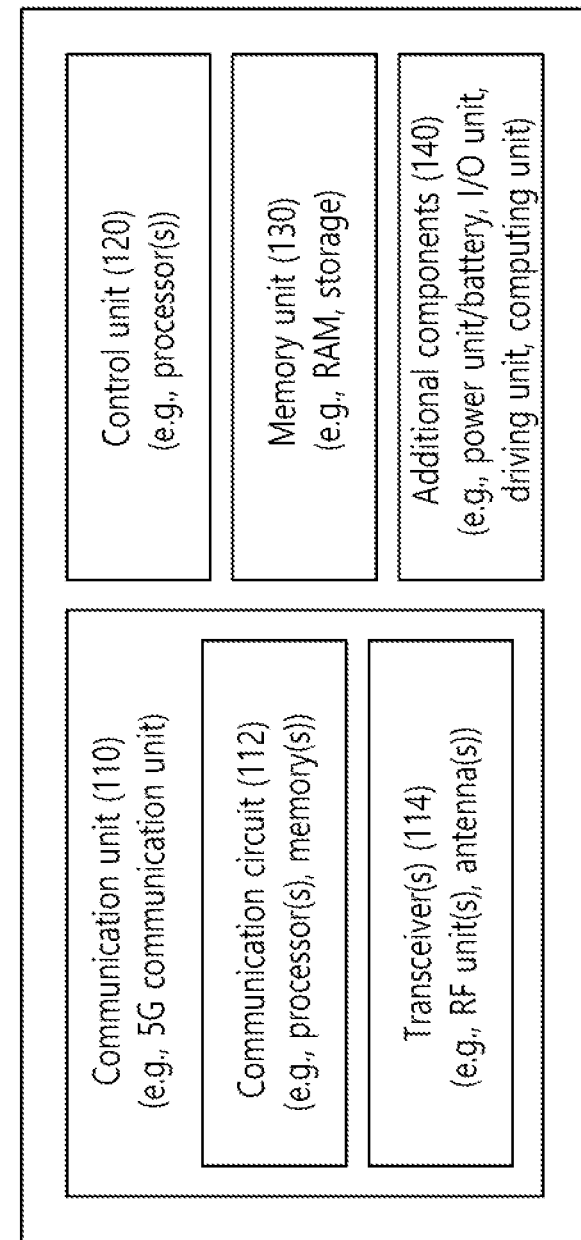
FIG. 43 shows another example of a wireless device applied to this specification.

FIG. 43 shows another example of a wireless device, in accordance with an embodiment of the present disclosure. The wireless device may be implemented in various forms according to a use-case/service (refer to FIG. 39).

Referring to FIG. 43, wireless devices (100, 200) may correspond to the wireless devices (100, 200) of FIG. 40 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 40. For example, the transceiver(s) (114) may include the one or more transceivers (106, 206) and/or the one or more antennas (108, 208) of FIG. 40. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 39), the vehicles (100b-1, 100b-2 of FIG. 39), the XR device (100c of FIG. 39), the hand-held device (100d of FIG. 39), the home appliance (100e of FIG. 39), the IoT device (100f of FIG. 39), a digital broadcast terminal, a hologram device, a public safety device, an MTC device, a medicine device, a fintech device (or a finance device), a security device, a climate/environment device, the AI server/device (400 of FIG. 39), the BSs (200 of FIG. 39), a network node, and so on. The wireless device may be used in a mobile or fixed place according to a use-example/service.

In FIG. 43, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 43 will be described in detail with reference to the drawings.

Figure 44:
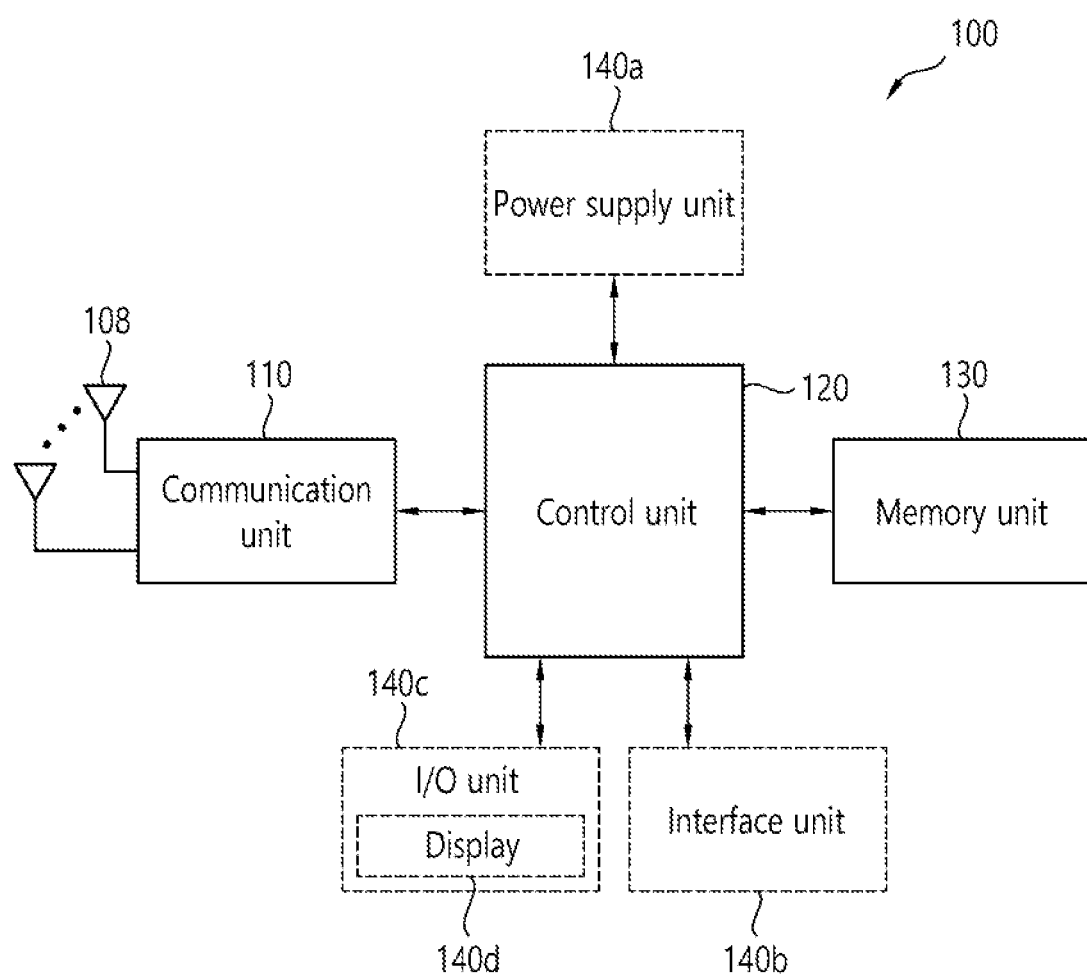
FIG. 44 illustrates a portable device applied to this specification.

FIG. 44 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 44, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 43, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 45:
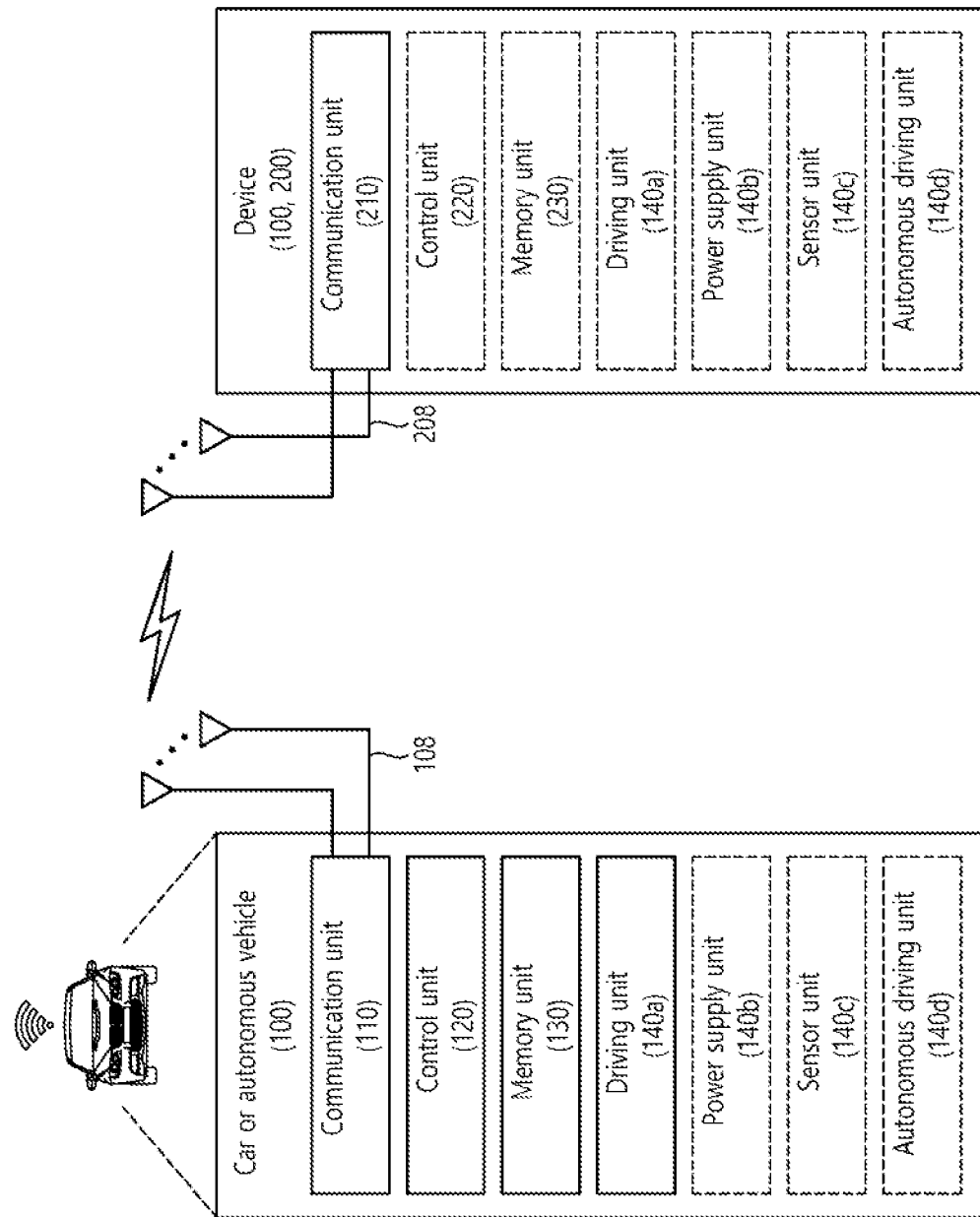
FIG. 45 illustrates a vehicle or an autonomous vehicle applied to this specification.

FIG. 45 shows a vehicle or an autonomous vehicle, in accordance with an embodiment of the present disclosure.

The vehicle or autonomous vehicle may be implemented by a mobile robot, a car, a train, a manned/unmanned Aerial Vehicle (AV), a ship, and so on.

Referring to FIG. 45, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 43, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 46:
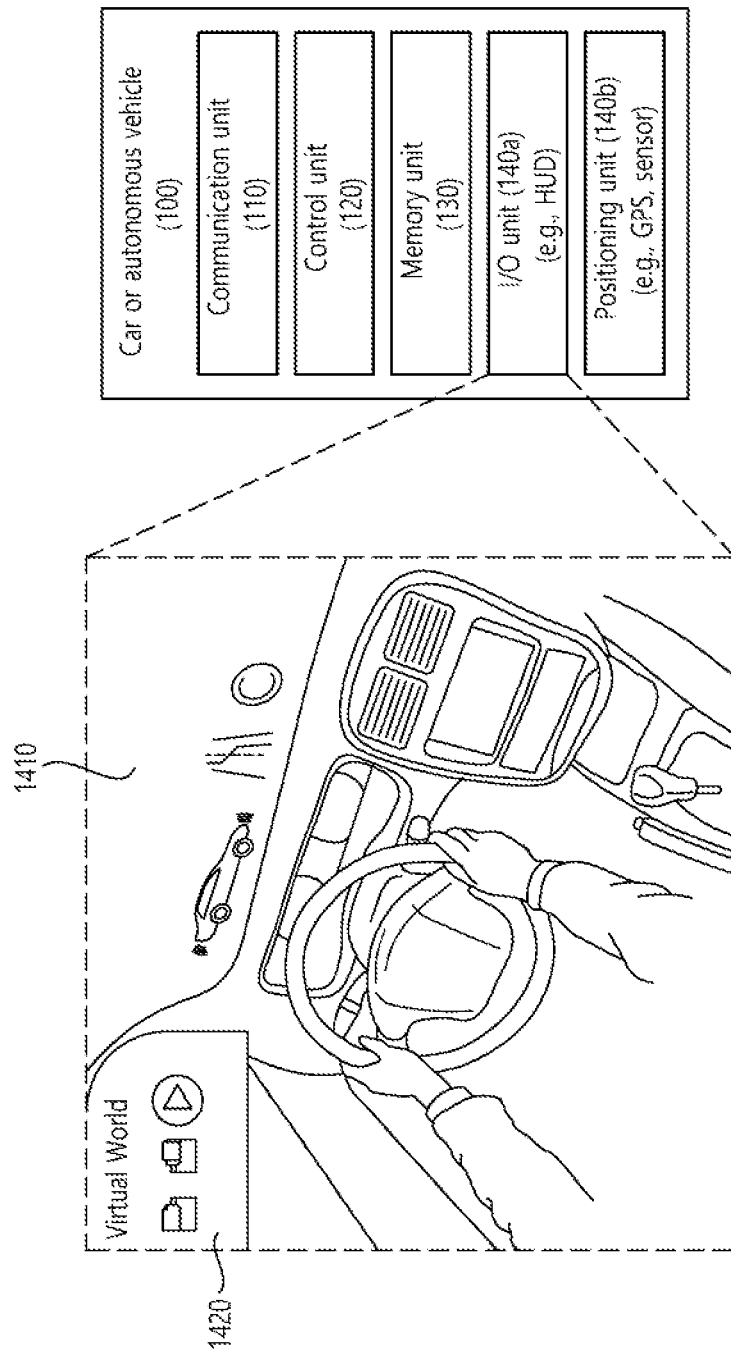
FIG. 46 illustrates a vehicle applied to this specification.

FIG. 46 shows a vehicle, in accordance with an embodiment of the present disclosure. The vehicle may be implemented as a transport means, an aerial vehicle, a ship, and so on.

Referring to FIG. 46, a vehicle (100) may include a communication unit (110), a control unit (120), a memory unit (130), an I/O unit (140a), and a positioning unit (140b).

Herein, the blocks 110~130/140a~140b correspond to blocks 110~130/140 of FIG. 43.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 47:
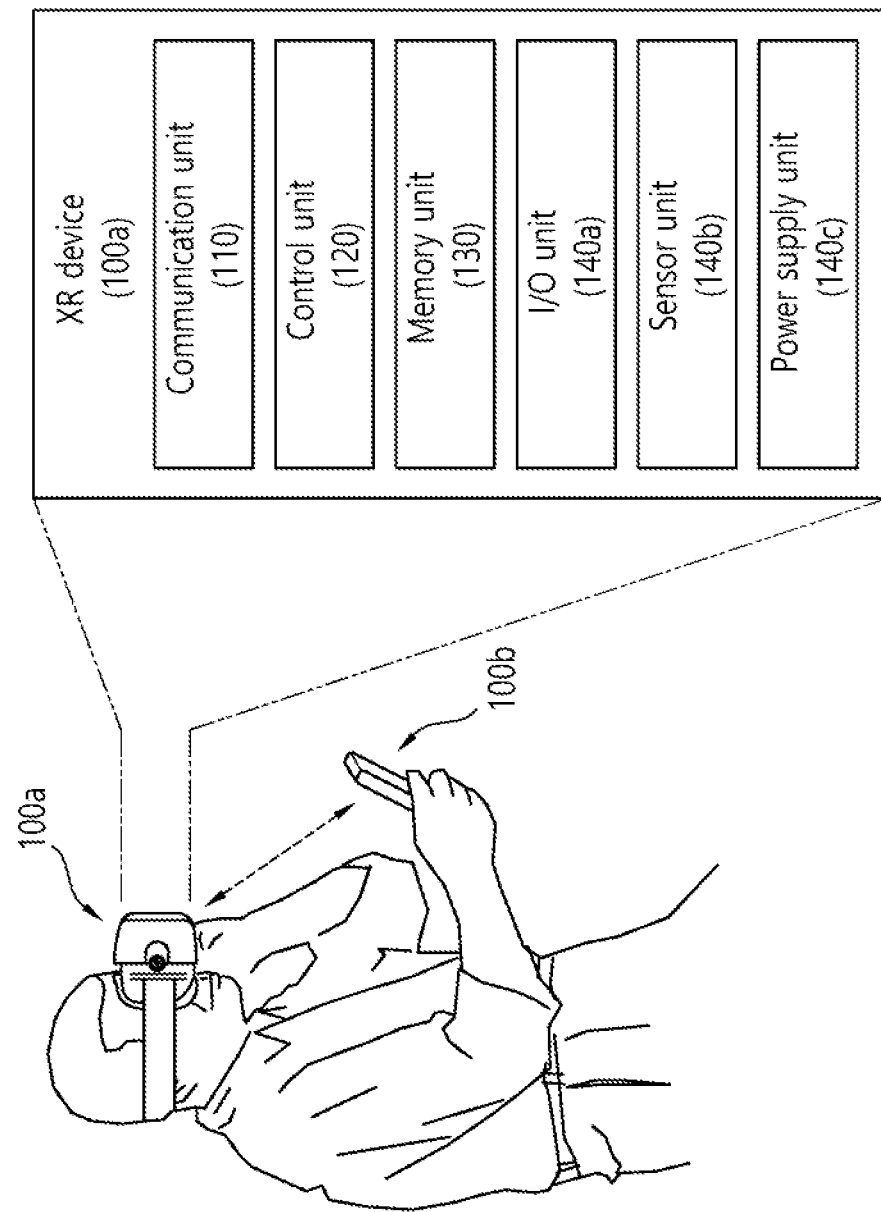
FIG. 47 illustrates an XR instrument applied herein.

FIG. 47 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 47, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 43, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 48:
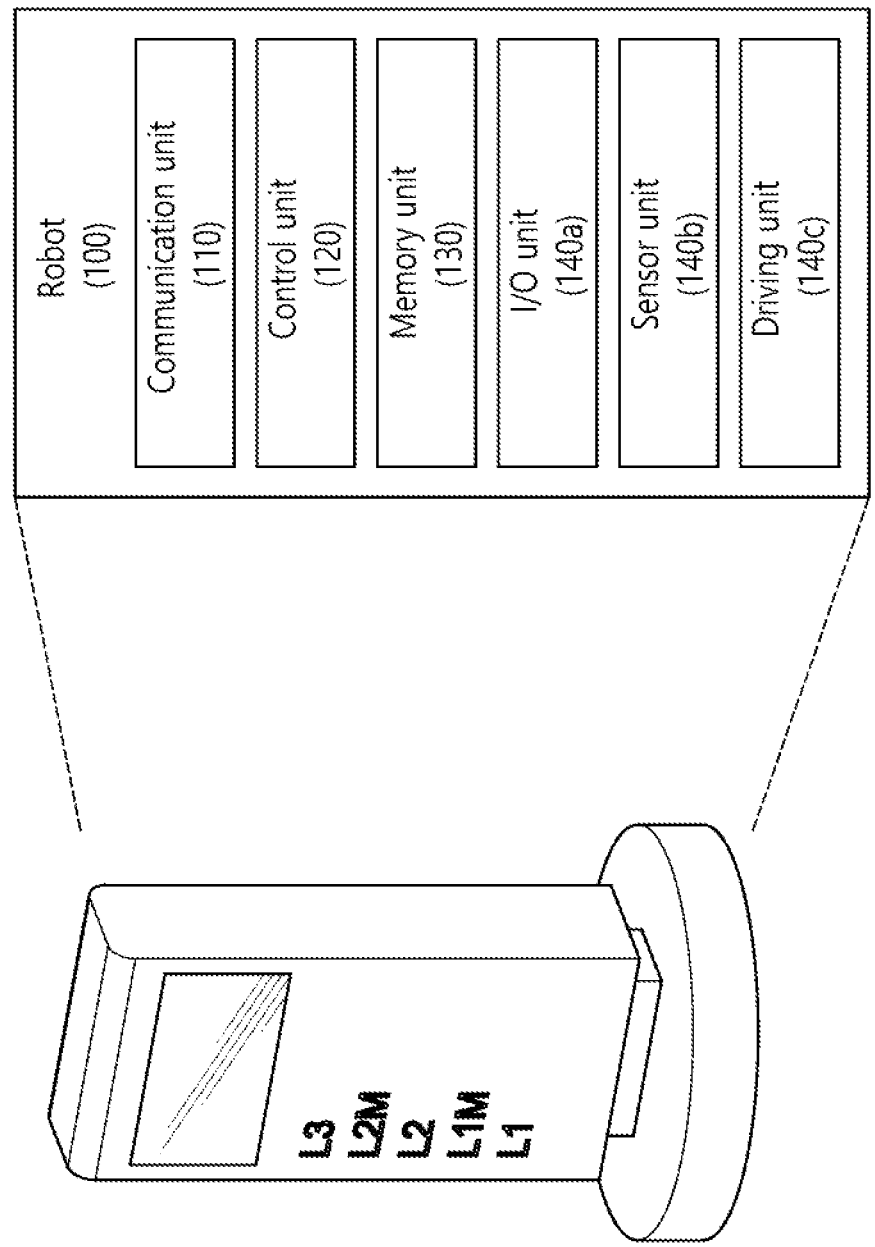
FIG. 48 illustrates a robot applied in this specification.

FIG. 48 shows a robot, in accordance with an embodiment of the present disclosure. The robot may be categorized into an industrial robot, a medical robot, a household robot, a military robot, and so on, according to a used purpose or field.

Referring to FIG. 48, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 43, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 49:
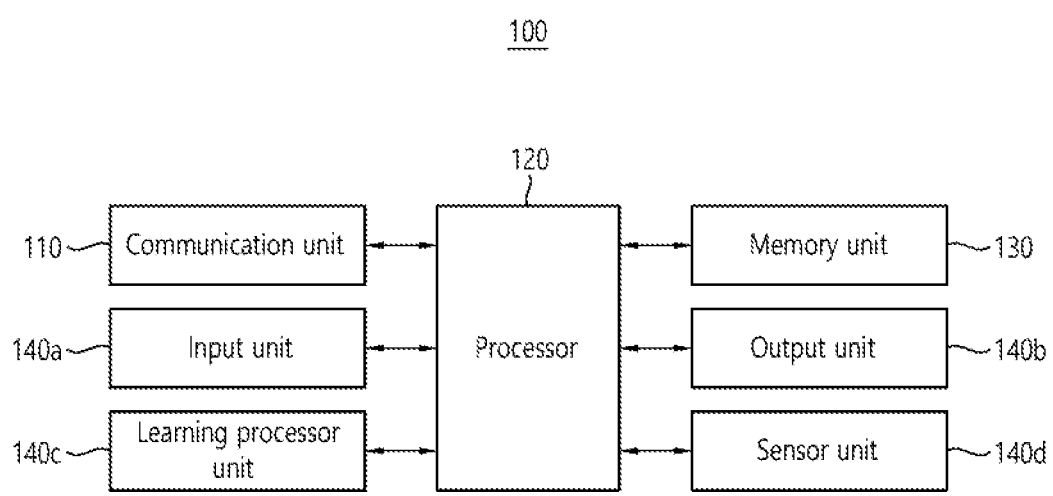
FIG. 49 illustrates an AI device applied to this specification.

FIG. 49 shows an AI device, in accordance with an embodiment of the present disclosure.

The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 49, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 43, respectively.

The communication unit (110) may transmit and receive wired/radio signals (e.g., sensor information, user input, learning models, or control signals) to and from external devices such as other AI devices (e.g., 100x, 200, 400 of FIG. 39) or an AI server (e.g., 400 of FIG. 39) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 39). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 40). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transmitting a first pulse train in a quantum communication system, the method performed by an apparatus and comprising:
   receiving a random access (RA) preamble from another apparatus;
   transmitting a random access response (RAR) to the another apparatus in response to the RA preamble;
   performing a radio resource control (RRC) connection procedure with the another apparatus;
   receiving data from the another apparatus; and
   decoding the data based on key information,
   wherein, based on that the first pulse train is generated in a laser diode of the apparatus and the first pulse train is transmitted from the apparatus to the another apparatus through a quantum channel after respectively passing through a first path and a second path, the key information is determined,
   wherein the second path includes N paths,
   wherein the N has a value less than or equal to K,
   wherein the N and the K are natural numbers, and
   wherein K is a maximum number of the second path.

2. The method of claim 1, wherein the laser diode is an element that supports tuning of wavelength.

3. The method of claim 1, wherein a last pulse of the first pulse train passes through the N paths during a time where the laser diode tunes wavelength.

4. The method of claim 3, wherein a length of each of the N paths is determined based on a length of the first path, a value for what number the path is among the N paths, a time interval between pulses of the laser diode and a speed of light in fiber.

5. The method of claim 1, wherein a value of the K is determined based on a time for tuning wavelength of the laser diode and a time interval between pulses of the laser diode.

6. The method of claim 1, wherein the second path includes a storage line.

7. The method of claim 6, wherein the first pulse train is branched and passes through the first path and the second path,
wherein the first pulse train passing through the second path joins in a beam splitter of the apparatus after the first pulse train passing through the first path.

8. The method of claim 1, wherein the apparatus detects a second pulse train related to transmission of the first pulse train based on a first tunable filter and a second tunable filter;
wherein each of the first tunable filter and the second tunable filter is an element that supports variably converting wavelength passed through each of the first tunable filter and the second tunable filter.

9. The method of claim 8, wherein the first tunable filter passes the second pulse train having first wavelength during a switching time of the second tunable filter,
wherein the first tunable filter passes the second pulse train having second wavelength after the switching time of the second tunable filter.

10. An apparatus comprising:
a transceiver;
at least one memory; and
at least one processor operably coupled with the at least one memory and the transceiver, wherein the at least one processor is configured to:
control the transceiver to receive a random access (RA) preamble from another apparatus;
control the transceiver to transmit a random access response (RAR) to the another apparatus in response to the RA preamble;
perform a radio resource control (RRC) connection procedure with the another apparatus;
control the transceiver to receive data from the another apparatus; and
decode the data based on key information,
wherein the apparatus includes a laser diode, a first path and a second path,
wherein, based on that the first pulse train is generated in a laser diode of the apparatus and the first pulse train is transmitted from the apparatus to the another apparatus through a quantum channel after respectively passing through a first path and a second path, the key information is determined,
wherein the second path includes N paths,
wherein the N has a value less than or equal to K,
wherein the N and the K are natural numbers, and
wherein K is a maximum number of the second path.

11. An apparatus comprising:
at least one memory; and
at least one processor operably coupled to the at least one memory, wherein the at least one processor is configured:
control a transceiver to receive a random access (RA) preamble from another apparatus;
control the transceiver to transmit a random access response (RAR) to the another apparatus in response to the RA preamble;
perform a radio resource control (RRC) connection procedure with the another apparatus;
control the transceiver to receive data from the another apparatus; and
decode the data based on key information,
wherein the apparatus includes a laser diode, a first path and a second path,
wherein, based on that the first pulse train is generated in a laser diode of the apparatus and the first pulse train is transmitted from the apparatus to the another apparatus through a quantum channel after respectively passing through a first path and a second path, the key information is determined,
wherein the second path includes N paths,
wherein the N has a value less than or equal to K,
wherein the N and the K are natural numbers, and
wherein K is a maximum number of the second path.

* * * * *